United States Patent [19]

Kato et al.

[11] Patent Number: 5,506,998
[45] Date of Patent: Apr. 9, 1996

[54] PARALLEL DATA PROCESSING SYSTEM USING A PLURALITY OF PROCESSING ELEMENTS TO PROCESS DATA AND A PLURALITY OF TRAYS CONNECTED TO SOME OF THE PROCESSING ELEMENTS TO STORE AND TRANSFER DATA

[75] Inventors: Hideki Kato; Hideki Yoshizawa; Hiroki Iciki; Daiki Masumoto, all of Kawasaki, Japan

[73] Assignee: Fujitsu Limited, Kawasaki, Japan

[21] Appl. No.: 261,889

[22] Filed: Jun. 17, 1994

Related U.S. Application Data

[63] Continuation of Ser. No. 854,890, Mar. 20, 1992, abandoned.

[30] Foreign Application Priority Data

Mar. 20, 1991 [JP] Japan ................................ 3-057347

[51] Int. Cl.$^6$ .......................... G06F 13/00; G06F 15/16; G06F 15/31
[52] U.S. Cl. .......................... 395/800; 395/250; 395/840; 364/931.41; 364/931.48; 364/931.51; 364/940.5; 364/238.6; 364/238.7; 364/238.9; 364/239; 364/271; 364/271.2; 364/DIG. 1
[58] Field of Search .......................... 395/800, 325, 395/250, 200, 275, 840; 340/825.05; 364/DIG. 1, DIG. 2

[56] References Cited

U.S. PATENT DOCUMENTS

| | | | |
|---|---|---|---|
| 4,195,351 | 3/1980 | Barnes et al. | 340/825.05 |
| 4,434,463 | 2/1984 | Quinquis et al. | 395/200 |
| 4,467,422 | 8/1984 | Hunt | 395/800 |
| 4,468,733 | 8/1984 | Oka et al. | 395/275 |
| 4,663,706 | 5/1987 | Allen et al. | 395/200 |
| 4,683,563 | 7/1987 | Rouse et al. | 370/16 |
| 4,763,254 | 8/1988 | Mori et al. | 395/200 |
| 4,816,993 | 3/1989 | Takahashi et al. | 395/250 |
| 4,821,174 | 4/1989 | Webb et al. | 364/200 |
| 4,922,418 | 5/1990 | Dolecek | 395/575 |
| 4,979,096 | 12/1990 | Ueda et al. | 395/325 |
| 5,168,572 | 12/1992 | Perkins | 395/800 |
| 5,367,642 | 11/1994 | Dally | 395/325 |
| 5,388,220 | 2/1995 | Okabayashi | 395/275 |

FOREIGN PATENT DOCUMENTS

| | | |
|---|---|---|
| 0236762 | 9/1987 | European Pat. Off. . |
| 0256661 | 2/1988 | European Pat. Off. . |

OTHER PUBLICATIONS

Proc. Int. Conf. on Wafer Scale Integration, 23 Jan. 1990, San Francisco, USA, pp. 220–228, Ramaswamy R. et al.
IEEE Transactions on Acoustics, Speech and Signal Processing, vol. 37, No. 12, Dec., 1989, New York US, pp. 1967–1979, J.–N. Hwang et al., 'A Systolic Neural Network Architecture for Hidden Markov Models'.
Journal of VLSI Signal Processing, vol. 1, No. 3, Nov. 1989, Dordrecht NL, pp. 221–251, Hwang J. N. et al., 'Parallel Algorithms/Architectures for Neural Networks'.

*Primary Examiner*—Meng-Ai An
*Attorney, Agent, or Firm*—Staas & Halsey

[57] ABSTRACT

A parallel data processing system performs a data processing by using a plurality of data processing units, namely, processor elements, synchronously. The parallel data processing system comprises a plurality of data processing units, a plurality of trays, and a clock generator. The plurality of trays are connected to respective data processing units and have a function of storing a plurality of data and a function of transmitting the data. The clock generator is producing a clock so that the data transfer between the trays and between the trays and the data processing units, and the data processing in the data processing unit is executed synchronously. Data are transferred between trays during the period in which they are processed, thus substantially eliminating the data transmission time. Furthermore, the interim result of the operation is stored in the tray and thus when the later operation needs the interim result, the interim result stored in the tray is efficiently used without the need to access the memory provided in the data processing apparatus.

16 Claims, 17 Drawing Sheets

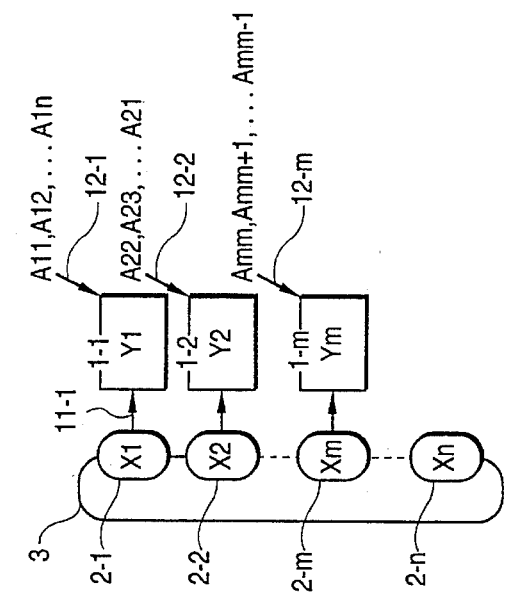
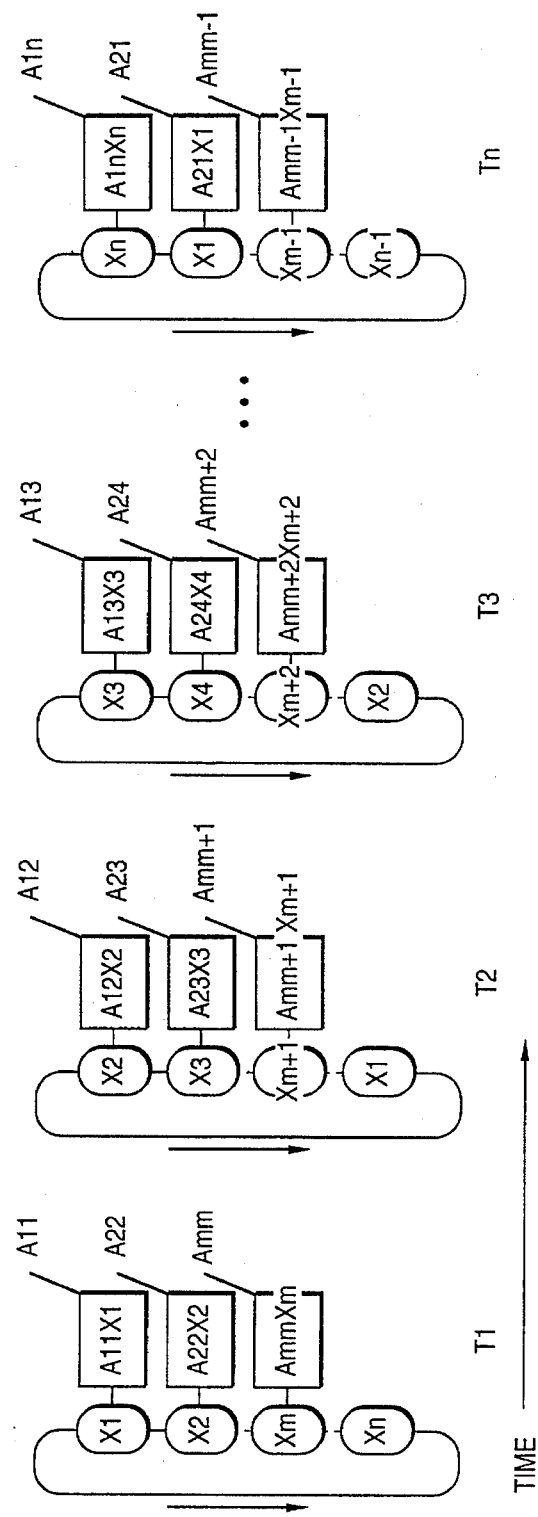
FIG. 8

( $Y = f(U)$; f IS SIGMOID FUNCTION
$U = \Sigma_{i=1,n} W_i X_i$ )

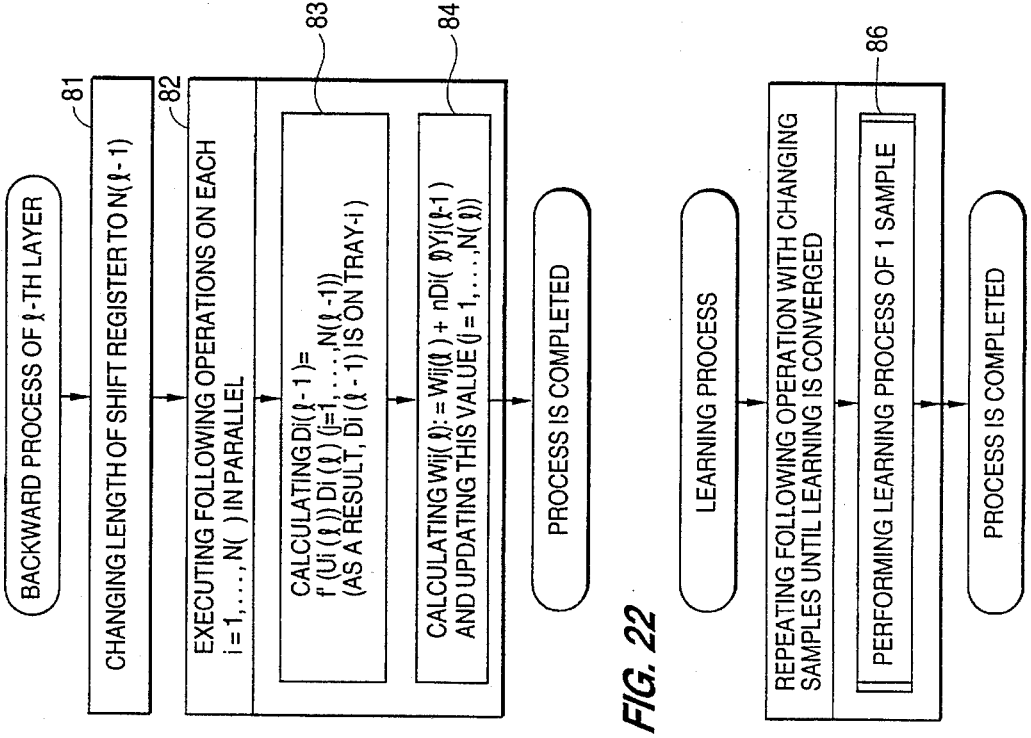
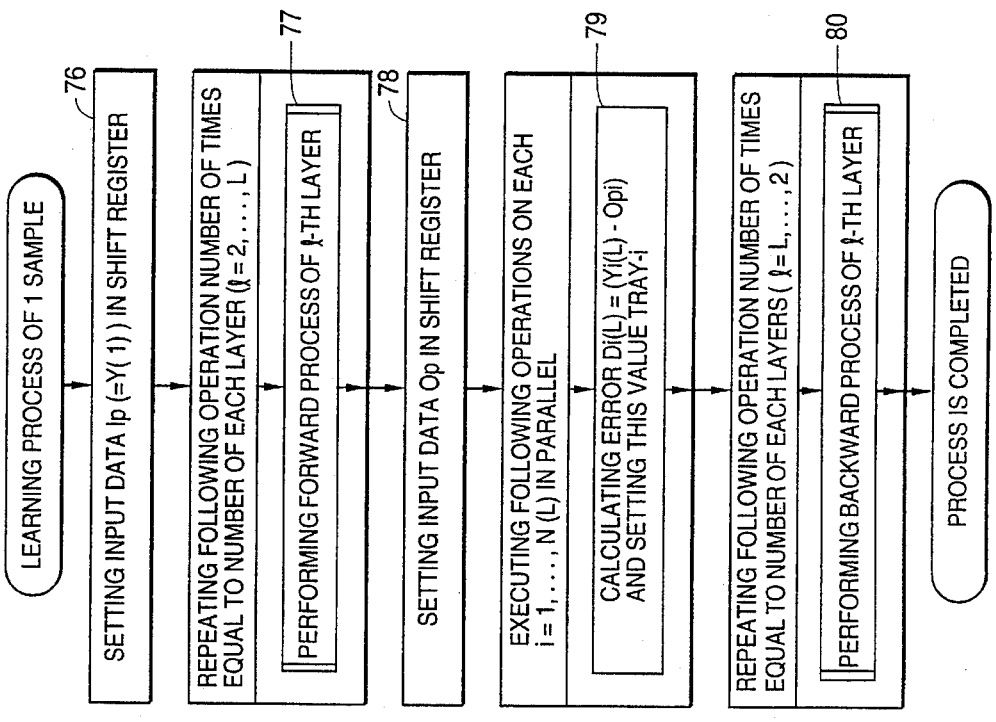

PARALLEL DATA PROCESSING SYSTEM USING A PLURALITY OF PROCESSING ELEMENTS TO PROCESS DATA AND A PLURALITY OF TRAYS CONNECTED TO SOME OF THE PROCESSING ELEMENTS TO STORE AND TRANSFER DATA

This application is a continuation of application Ser. No. 07/854,890, filed Mar. 20, 1992, now abandoned.

BACKGROUND OF THE INVENTION

1. Field of the Invention

The present invention relates to a data processing system, and specifically to a parallel processor for processing data by synchronously using a plurality of data processing units.

2. Description of the Related Art

With the increasing use of data processing systems and methods in many fields, an increasing amount of data are being processed. Specifically, a high-speed data processing technology is required in image and voice processing. A plurality of data processing units must be synchronously used to perform parallel data processes. Generally, an important concept in using a plurality of processing units is the number-of-units effect. This means that a data processing speed can be improved in proportion to the number of data processing units. In a parallel processing system, it is very important to know the most efficient number-of-unit effect.

The main reason for the deterioration of the number-of-units effect, other than the limit of the number of processing units for parallel use, is that the total processing time can be greatly prolonged because the data transmission time must be added to the time taken for the data processing operation. Therefore, to maximize the number-of-units effect, full use must be made of the capacity of a data transmission line. However, it is difficult to realize this.

Nevertheless, the number-of-units effect can be practically improved when processes are performed regularly.

First, data are provided in a systolic array, that is, cyclically. An operation is performed when the flow of two groups of data becomes synchronous. That is, the systolic array method refers to a parallel processing system in which processes are performed regularly. A one-dimensional systolic array method referred to as a ring systolic array method is a parallel data processing system for systolically processing data by synchronously using a plurality of data processing units. This system can be realized easily. Good examples of regular processes are matrix operations based on an inner product operation of a vector and parallel processes for outputting a result of a multiply-and-add operation of a neural network using a nonlinear function.

FIG. 1 shows the principle configuration of the conventional common-bus-connection-type parallel system. In FIG. 1, 91 is a processor element, 4 is a memory, 93 is a common bus, 92 is a bus connected to the common bus, and 94 is an internal bus for connecting the processor element to the memory 4 to be connected corresponding to a processor element. In this common-bus-connection-type parallel system, communication is made between processor elements (PE) through the common bus 93. Since one set of data is sent through the common bus in a specific time period, the communication through the common bus must be synchronized through the common bus.

FIG. 2 is a flowchart of an operation for obtaining a matrix-and-vector product in the common-bus-connection-type parallel system. Each PE multiplies data X from another PE by W in the memory. The resultant product is added to Y. Therefore, first as shown in the flowchart, the content of the register in the i-th PE, that is, $Y_i$, is set to 0. Then, the following processes are repeated n times. That is, if $X_j$ is provided to the common bus 93, the i-th PE 91 multiplies the input from the bus 92 connected to the common bus 93 by the input (Wij) provided by the memory 4 through the internal bus 94, and adds the product to register $Y_i$ in the i-th PE 91. This process is repeated n times.

FIG. 3 shows the principle configuration of the conventional ring systolic system. In FIG. 3, 120 is a processor element (PE). Each PE is connected by a cyclic bus 122. 121 is a memory for storing an element $W_{ij}$ of a coefficient. $W_{11}$, $W_{12}$, ..., $W_{33}$ are elements of a coefficient matrix. Generally, $W_{ij}$ is an ij-th element of the matrix. The coefficient matrix W is multiplied by a vector $x=(X_1, X_2, X_3)$ in the ring systolic method as follows.

FIG. 4 shows the i-th internal configuration of a processor element (PE) 120. In FIG. 4, 123 is a multiplier, 124 is an adder, 125 is an accumulator (ACC). The memory 121 is of a FIFO (first-in, first-out) type, and is outputting $W_{ij}$, that is, an element in the j-th column and the i-th row of the coefficient matrix. The data in this FIFO is circulated at the next clock after it is outputted, and inputted again at the last stage of the memory through a bus 126. Therefore, as shown in FIG. 4, $W_{i1}$, ... $W_{i,j-1}$ are already stored at the last stage after circulation.

Each element of a vector x is inputted through the cyclic bus 122. In this configuration, an element $X_j$ is inputted. The intermediate result of an inner-product operation of $W_{i1} \times X_1 + \ldots + W_{i,j-1} \times X_{j-1}$ is stored in the accumulator 125, outputted from the accumulator 125, and inputted to one input of the adder 124. The multiplier 123 multiplies external $X_j$ by $W_{ij}$ outputted from the FIFO. The product is inputted to the other input of the adder 124. The addition result is added to the present content of the accumulator 125, and the result is stored in the same accumulator 125.

Repeating the above procedure gives an inner product obtained by multiplying the row vector of the i-th row in the coefficient matrix W by the vector x provided externally. A switch is provided to select whether the data $X_j$ are passed through to an external unit, or received to be inputted to the multiplier 123.

When a product is obtained by multiplying a matrix w by a vector x using the above described PE, a PE-1 first multiplies $W_{11}$ by $X_1$ as shown in FIG. 3, $X_2$ comes through a PE-2 on the right at the next timing, and the multiplication $W_{12} \times X_2$ is performed since $W_{12}$ is outputted from the memory 121. Likewise, at the next clock, the product of the multiplication $W_{13} \times X_3$ is obtained, and the operation of multiplying the first row of a matrix by a vector x can thus be performed by the PE-1.

An operation of multiplying the second row by a vector is performed by the PE-2. That is, $W_{22}$ is multiplied by $X_2$. At the next clock cycle $W_{23}$ is multiplied by $X_3$, and at the next clock cycle $W_{21}$ is multiplied by $X_1$ which has returned cyclically. Likewise, an operation of multiplying the third row by a vector can be performed by multiplying $W_{33}$ by $X_3$, $X_{31}$ by the cyclic $X_1$, and $W_{32}$ by the cyclic $X_2$, and then obtaining an inner product.

In the above process, the operations of multiplying $W_{11}$ by $X_1$, $W_{22}$ by $X_2$, and $W_{33}$ by $X_3$ can be performed simultaneously. However, as shown in FIG. 4, a shift in the arrangement of the coefficient matrix elements is required to perform the simultaneous operation. In the ring systolic array method, a data transmission line can be used efficiently and a desirable number-of-units effect can be obtained by synchronously transmitting data between each PE and performing data processes at each PE.

FIG. 5 shows a combination of configurations of the ring systolic system shown in FIG. 3 and the combination comprises cyclic buses 122-1, 122-2 and 122-3. In this configuration, a serial matrix can be multiplied by a vector. Since the processes in the systolic array method can be performed regularly, the capacity of a data transmission line can be fully utilized, and the number-of-units effect can thus be greatly improved.

In a conventional parallel processing system using a common bus connection shown in FIG. 1, since PEs, that is, processing elements are connected through a common bus, only one set of data can be transmitted at one timing. Additionally, a connection through a common bus requires synchronization over the whole common bus.

Therefore, in the conventional common-bus-connection-type parallel processing system, only a few processes can yield a desirable number-of-units effect. Besides, when the number of connected PEs increases in a common bus connection process, the common bus must be very long. Therefore, it is hard to synchronize the whole common bus, and the system is not appropriate for a large-scale parallel process.

In the conventional ring systolic array method shown in FIG. 3, the number-of-units effect can be obtained by synchronously performing the data transmission between PEs and the data process by PEs. However, in this method, the data transmission between PEs and the data process by PEs must match in timing.

Additionally, in the conventional method, when the optimum number of data processing units is not equal to that of data storing units in the operation of multiplying an m-row-by-n-column matrix by a vector, for example, a PE not involved in an actual data process is required. That is, there can be a number of idle PEs, and the number-of-unit effect can be greatly deteriorated.

That is, a problem to be solved efficiently corresponds to a circuit configuration, and the number-of-units effect deteriorates if the size of a problem to be solved does not indicate an optimum value. In other words, problems which can achieve a desirable number-of-units effect are limited, so the method cannot be applied widely. Therefore, the conventional method is poor in flexibility and applicability, resulting in difficulties in realizing a high-speed data processing system capable of processing data to a reasonable extent.

SUMMARY OF THE INVENTION

An object of the present invention is to provide in a tray a plurality of registers for each storing the output of respective units of respective layers obtained from a forward processing for use in a back propagation in a learning process of a neuron computer operation in order to update the weight within the neural network, instead of storing the output of the respective layers in that memory provided in a processor element which requires a relatively large capacity and a relatively long access time, thereby increasing the size and the operation speed of the parallel data processing system.

Another object of the present invention is to decrease the overhead of a data transfer using a hardware structure with the same or similar degree as the above recited ring systolic array system or the common bus connecting parallel system.

A further object of the present invention is to provide a parallel data processing system for performing a matrix operation or a neuron computer operation by utilizing parallelism to the maximum extent with regard to a process of obtaining a product of a matrix of m rows x n columns (m multiplied by n) and a vector, thereby achieving an increase in the number of processor elements to be parallelly operated.

A feature of the present invention resides in a parallel data processing system comprising a plurality of data processing units comprising a plurality of trays, wherein a proportion of the trays are connected to the data processing units on a one-by-one basis and transferring and storing a plurality of data; and a clock generator for generating a clock signal so that the data transfer between said trays and the data processing units, and data processing in the data processing units are synchronized with each other.

BRIEF DESCRIPTION OF DRAWINGS

FIG. 8 which illustrates a practical operational example of the system shown in FIG. 7

FIG. 20 is a flowchart of a backward process;

FIG. 21 shows a view for explaining the repetitive processes performed until a learning converges;

FIG. 22 is a process flowchart of the error back propagation;

PREFERRED EMBODIMENTS

Figure 6:
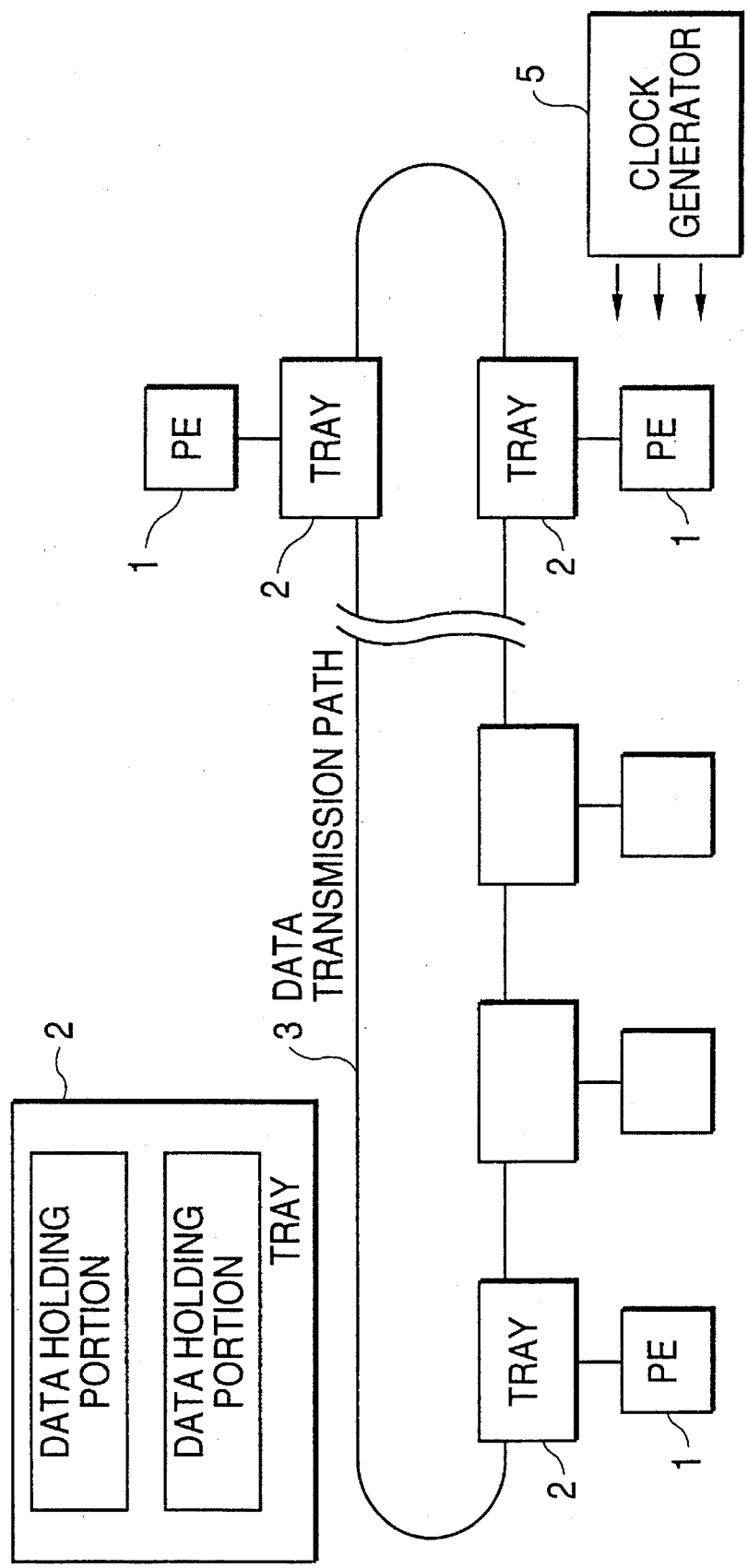
FIG. 6 is a block diagram for explaining the principle structure of the present invention.

FIG. 6 is a block diagram for explaining the principle of the present invention. In FIG. 6, 1 designates a data processing unit, namely, a processor element (PE), and 2 designates a tray, which has a function of holding a plurality of data and a function of transferring the data and connecting all the trays or a proportion of them to the data processing unit 1 one-by-one.

3 designates a data transfer path between trays. This path and the trays constitute a cyclic shift register on which the data are cyclically shifted. The cyclic shift of the data is performed in one direction counter-clockwise or bidirectionally so that the direction of the cyclic shift can be selected as clockwise or counter-clockwise based on an application of this parallel data processing system.

"Tray" is a word adopted in the present invention to clarify the difference from the prior art technology. The original meaning of the word is a flat board to carry things on, and also refers to a tray or round table used in eating places such as cafeterias. Data to be processed are put on these trays and distributed to each of the data processing units, that is, processor elements.

In FIG. 6, each tray 2 is provided with elements of a vector to be processed, and the elements circulates in a cyclic shift register formed of a ring comprising the trays 2 and the data transmission path 3. During this process, each processor element sequentially receives data and performs a necessary process such as inner product operations of a vector.

The tray itself as a hardware is similar to a router used in a common parallel processing system. However, in this invention, the subject of an operation is the processor element, and the router is only for realizing communication between processors. In the present invention, a different word is used to conceptionally clarify that the subject for ruling the whole operation is a ring cyclic shift register, that is, a tray.

As shown in FIG. 6, tray 2 comprises a plurality of data holding units such as registers for storing interim results of an operation such as output values of respective units of respective layers necessary for updating a weight in the back propagation when a learning of the neuron computer is performed. Such interim results can be stored in a memory provided within the data processing unit, but in this case it becomes necessary to access the memory provided in the data processing unit every time an interim result is required, thus requiring a time to provide the interim result to the tray. In contrast, the present invention can update the weight at a higher speed as an output of the previous layer is held in one of the data holding units in the tray. An input value of a neuron is required to update the weight. Therefore, this input value should be stored in a memory in the processor unit. Namely, in order to update the weight at a high speed, the memory of the processor unit should hold all of the n input data and this, the memory in the whole parallel data processing system require a capacity of m×n if m processor units are provided. In contrast, according the present invention only a capacity of n data is required for the whole parallel processing system trays.

Figure 1:
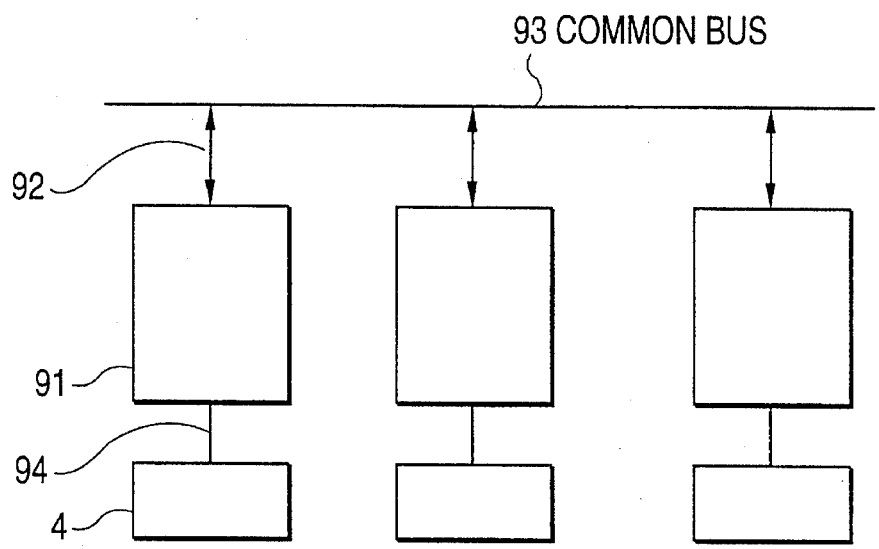
FIG. 1 shows the principle configuration for explaining the conventional common-bus-connection type parallel system.
Figure 2:
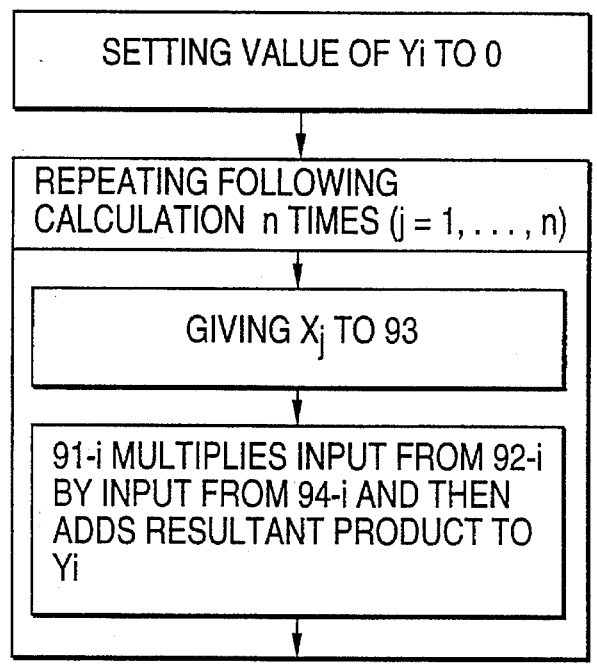
FIG. 2 is a flowchart of an operation for obtaining a matrix-and-vector product in the common-bus-connection type parallel system.
Figure 3:
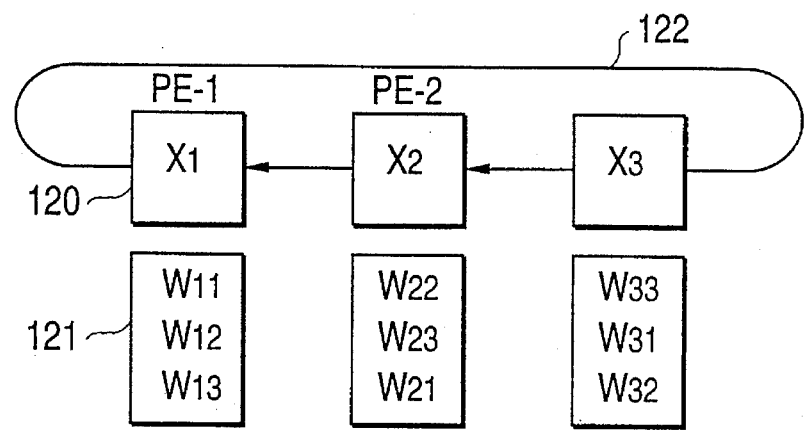
FIG. 3 shows the principle configuration for explaining the conventional ring systolic method.
Figure 4:
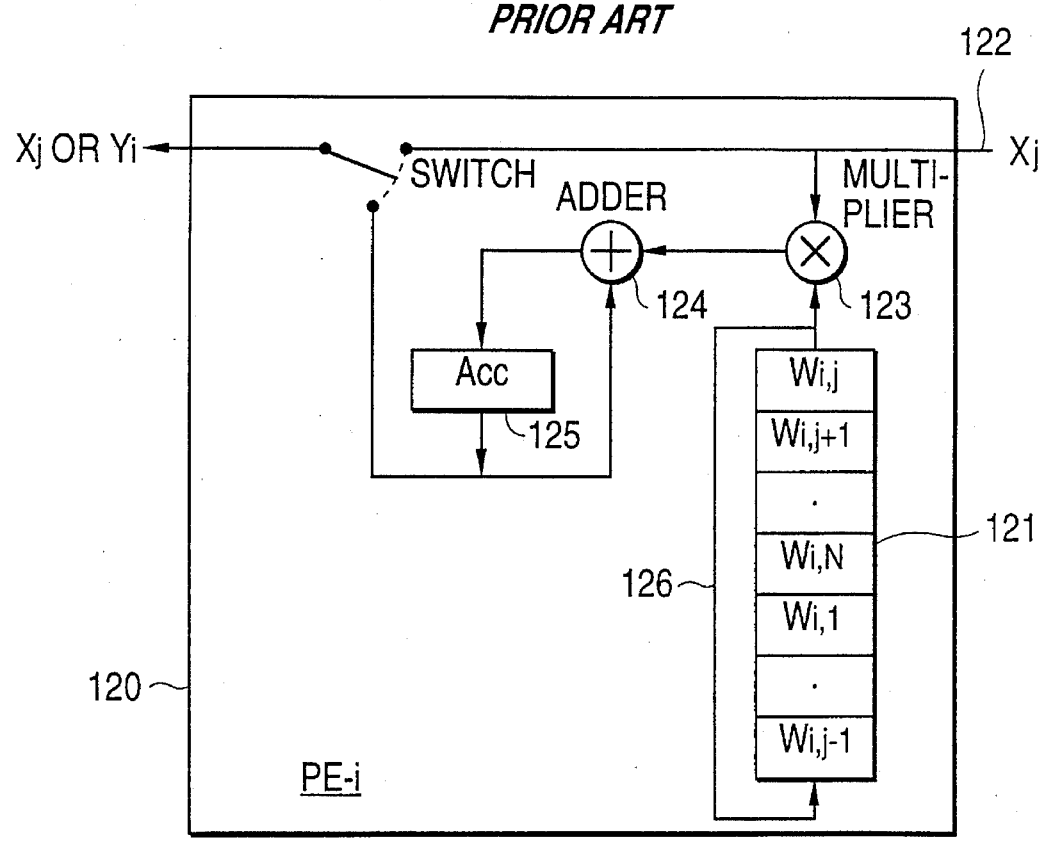
FIG. 4 shows the internal configuration of a processor element (data processing unit)
Figure 5:
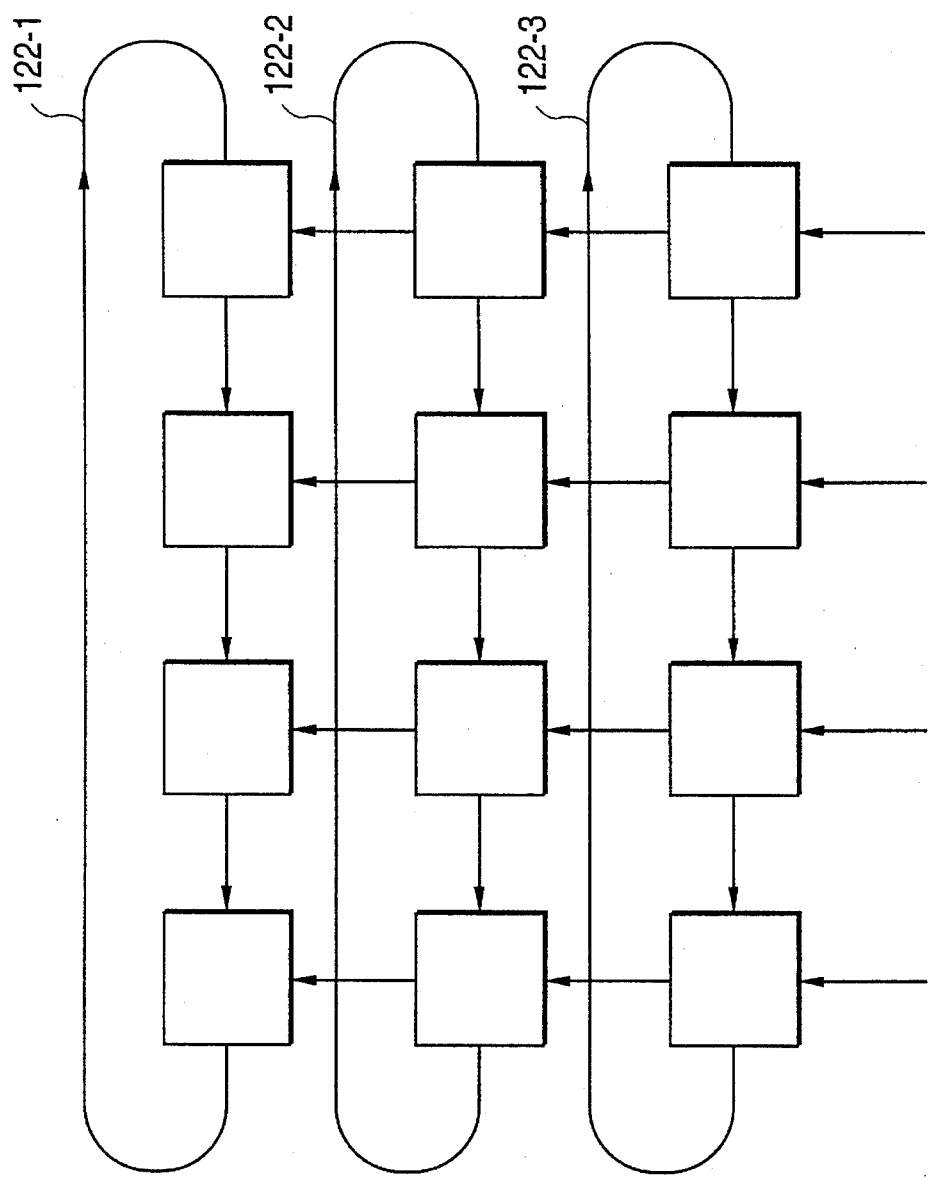
FIG. 5 shows a view of the combination of configurations of the ring systolic method shown in FIG. 3.

In the present invention, when a product is calculated by multiplying an m×n matrix A by a vector x of the number of elements n, the product can be obtained in a processing time proportional to "n" using m data processing units and n trays even though the number "m" of rows is smaller than the number "n" of columns or "m" is larger than "n", thus obtaining a desirable number-of-unit effect. That is, as shown in FIG. 4, the data processing unit multiplies inputted data by data in a memory when a value of an accumulator in the unit is "Y", adds the product to the value Y, and shifts the elements of the vector x between the adjacent trays in the shift register. These operations are performed for a configuration comprising "m" data processing units 1 for performing multiplication of inputted data by memory data and accumulation of the multiplication results, that is, a multiply-and-add operation, and "n" trays 2. Repeating the above process "n" times performs a multiplication of the m×n matrix A by n-dimensional vector using "m" data processing units in a processing time proportional to "n". In the present invention, unlike in the prior art technology, a desirable number-of-unit effect can be obtained without a timing process even though "m" and "n" indicate different values by separating the data processing unit 1 from the trays 2 capable of storing data. Furthermore, in the present invention, a data transmission between the trays 2 and computation process by the data processing unit 1 are performed concurrently. Normally, since the data processing operation by the data processing process takes longer than the data transmission, the data transmission time can be completely hidden by the data processing time. That is, the data can be transmitted while the data are being processed, thus successfully shortening the total processing time.

In FIG. 6, where the number of data processing units 1 and trays 2 necessary for the operation is excessive, the cyclic shift register formed by the trays 2 and the data transmission path 3 is short-cut, thereby decreasing the number of trays 2 included in the cyclic shift register and decreasing the number of the effective data processing units. As a result, data are transferred between the trays without unnecessarily going through extra trays, thereby increasing the processing speed.

The data processing unit 1 and the tray 2 shown in FIG. 6 can transmit and receive data between them. The following three operations are synchronized with each other.

(1) The data transfer in which the data are shifted through respective trays on the shift register.

(2) The data transfer between the tray 2 and the data processing unit 1.

(3) The data processing operation within the data processing unit 1.

The preferred embodiments of the present invention are explained in detail by referring to the attached drawings.

Figure 7:
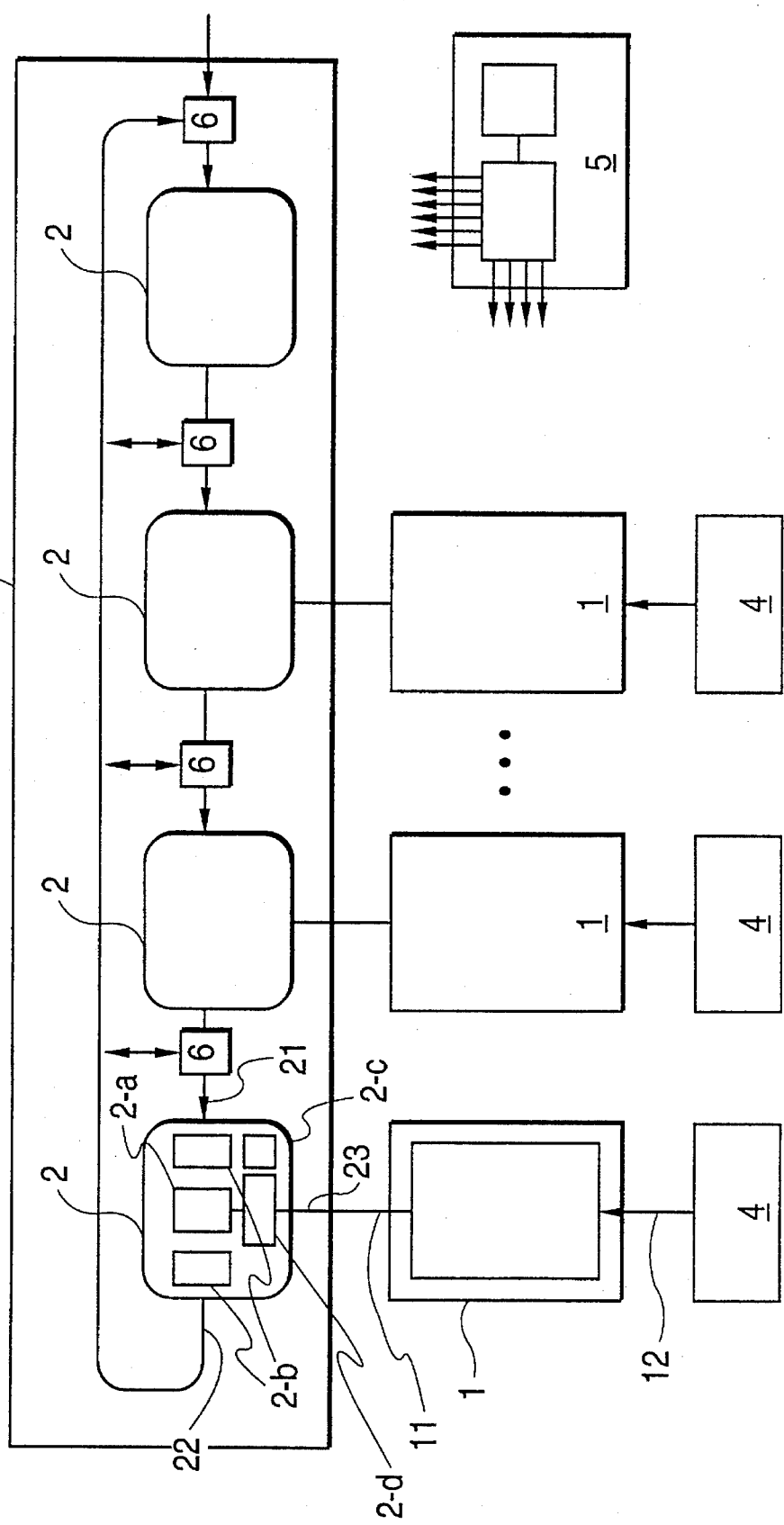
FIG. 7 is a block diagram of the structure of a parallel data processing system according to the present invention.

FIG. 7 is a block diagram of the structure of a parallel data processing system according to the present invention. Like reference numbers designate like parts in FIG. 6 and FIG. 7. 11 designates a first input of the data processing unit 1, 12 the second input of the data processing unit 1, 21 the first input of the tray 2, 22 the first output of the tray 2, 23 the second output of the tray 2, 4 a memory, 5 a clock supplier and 6 a connecting unit. Connecting unit 6 in which external data is input to the cyclic shift register comprising the tray 2 and the data transfer path 3 performs directional data transfer, for example. The connecting means operates as a switch for the transfer path and decreases the number of data processing units 1 and trays 2 for an operation by outputting the data in the left direction when the data are outputted in a downward direction designated by an arrow. When this short-cutting operation is conducted, the tray and the data processing unit on the right side of the connecting means 6 which performs the short-cut operation becomes invalid and an operation is performed by the tray and the data processing unit on the left side of the connecting unit 6.

In the system shown in FIG. 7, an object of the present invention, that is, to reduce the overhead attributable to data transmission, and the second object, that is, to obtain a desirable number-of-units effect in a calculation of multiplying an m×n matrix by a vector. Since the operation is almost the same as that for FIG. 6, the detailed explanation is given below by referring to FIG. 8 which illustrates a practical operational example of the system shown in FIG. 7.

In FIG. 8, the data $X_1-X_n$ in the tray 2 are elements of the vector x, and total n elements. The number of the data processing units is m as shown in $Y_1, Y_2, \ldots, Y_m$, where m<n.

There are m×n elements $(A_{11}-A_{mn})$ of the m×n matrix. In a data processing unit 1-1, the first row $A_{11}, A_{12}, \ldots, A_{1n}$ of a coefficient matrix is inputted synchronously with the clock through an input bus 12-1.

$A_{22}, A_{23}, \ldots, A_{21}$ are sequentially applied to a data processing unit 1-2 at systolic operation timing. Likewise, $A_{mm}, A_{m\,m+1}, \ldots, A_{m\,m-1}$ are applied to a data processing unit 1-m at each timing.

At the timing $T_1$, trays 2-1, 2-2, ..., 2-n contain $X_1, X_2, X_m, \ldots, X_n$ as shown in FIG. 8, and elements $A_{11}, A_{22}, \ldots, A_{mm}$ of the coefficient matrix are applied to the units 1-1, 1-2, ..., 1-m. Therefore, at this timing, the data processing unit 101 multiplies $A_{11}$ by the data $X_1$ in a tray 2-1, the data processing unit 1-2 multiplies $X_2$ in the corresponding tray 2-2 by $A_{22}$ provided by a memory, and the data processing unit 2-m multiplies $A_{mm}$ by $X_m$.

The processes above are performed at the timing $T_1$ shown in FIG. 8. That is, in the timing at which a sum of products is calculated, a bus 11-1 contains $X_1$, a bus-12-1 contains $A_{11}$, a bus 11-2 contains $X_2$, a bus 12-2 contains $A_{22}$, a bus 11-3 contains $X_3$, a bus 12-3 contains $A_{33}$, a bus 11-m contains $X_m$, and a bus 12-m contains $A_{mm}$. Therefore, a product is obtained according to the timing $T_1$ as shown in FIG. 8.

Since the value in an accumulator Y is 0 at this time, 0 and the product are added as an intermediate result of the inner product. When the multiply-and-add operation is calculated, a shifting operation is started, thus entering the timing $T_2$ shown in FIG. 8. After the shift, the tray 2-1 contains $X_2$, the tray 2-2 contains $X_3$, and the tray 2-m contains $X_{m+1}$. Elements $A_{12}, A_{23}$, and $A_{m\,m+1}$ of the coefficient matrix are inputted corresponding to the data processing unit 1-1, ..., 1-m.

Therefore, at the timing $T_2$, the product of the multiplication $A_{12} \times X_2$ obtained at the timing $T_2$ is added to the value Y in the accumulator. Accordingly, in the unit 1-1, the product of the multiplication $A_{12} \times X_2$ is added to the product of the multiplication $A_{11} \times X_1$ obtained at the timing $T_1$, and the result is stored in the accumulator. Likewise, in the unit 1-2, the product $A_{23} \times X_3$ added to the previous result $A_{22} \times X_2$ is stored into the accumulator. Similar operations are performed in the unit 1-m. Then, after the next shift, the process enters the timing $T_3$. The tray 2-1 contains $X_3$, the tray 2-2 contains $X_4$, the tray 2-m contains $X_{m\,m+2}$, and the tray 2-n contains $X_2$, and the operation at $T_3$ shown in FIG. 8 can thus be performed.

Figure 9:
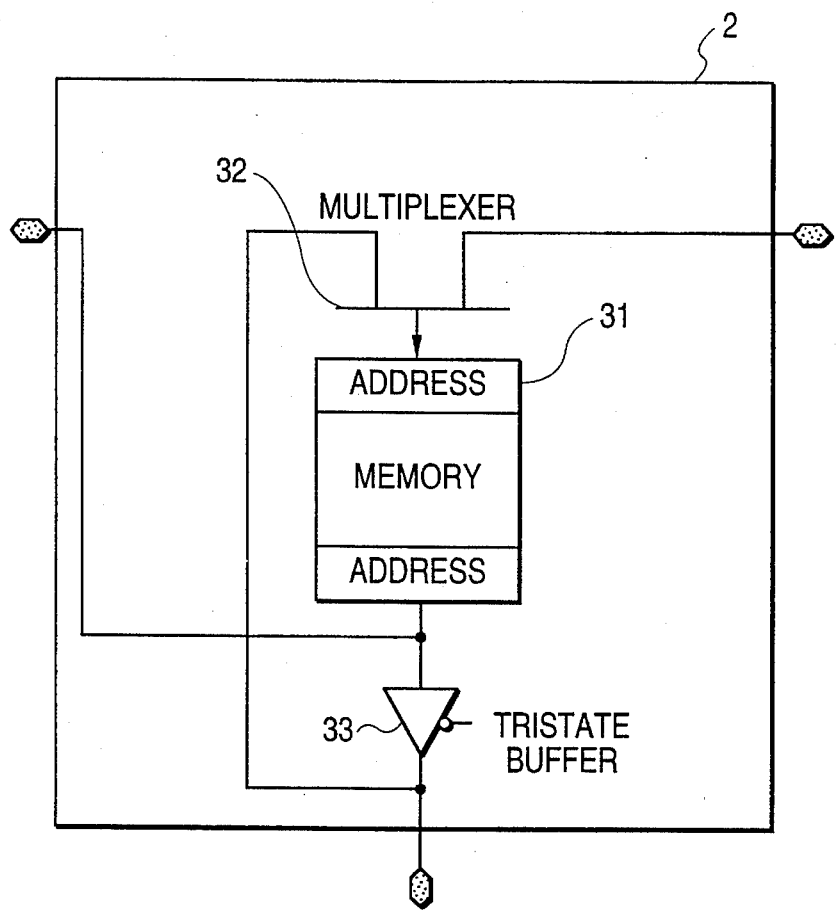
FIG. 9 is a block diagram for explaining the structure of the first embodiment of the tray.
Figure 10:
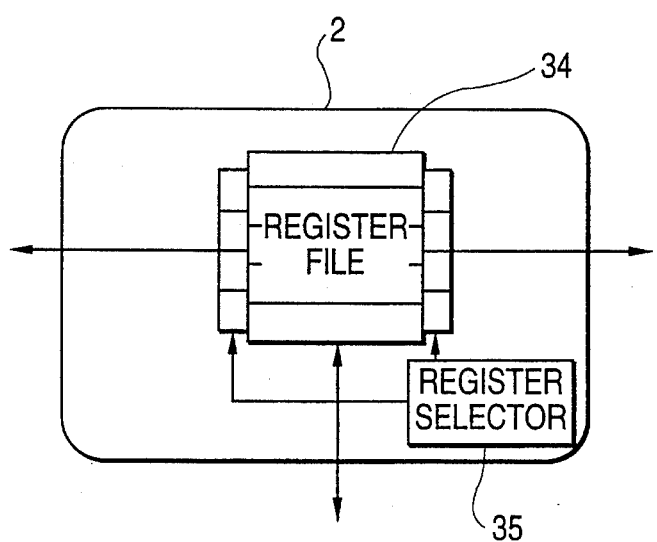
FIG. 10 is a block diagram of the second embodiment of the tray.

FIGS. 9 and 10 show the block diagrams of the first and second embodiments, respectively, of the tray. In these embodiments, data are transferred unidirectionally, namely, from right to left, among the trays. The data are transferred bidirectionally between the tray and the processor. As shown in FIG. 9, the first embodiment comprises a memory 31 which has a plurality of storing areas designated by addresses, a multiplexer 32 for enabling the data to be inputted to the memory 31 by selecting either one of the data from the other tray or the processor element, and tri-state buffers 33 which are turned on when the data are outputted to the processor element from the memory 31.

In case of a neurocomputer, the data for the first layer is written into and read from the first address, for example, and the data for the second layer is written into and read from the second address. As the data for the first layer, for example, is held in the tray and is circulated, a data storage capacity required for the parallel data processing system can be reduced.

The second embodiment shown in FIG. 10 comprises a register file 34 comprising a plurality of register stages and a register selector 35. Respective difference data can be stored in respective stages of the registers which constitute the register file 34. The register file 34 operates in the almost same manner as the memory 31 shown in FIG. 9, but takes a shorter time for an input and output of the data. The register selector 35 controls which register in the register file 34 the data are stored in or which register in the register file 34 the data are read out from.

Figure 11:
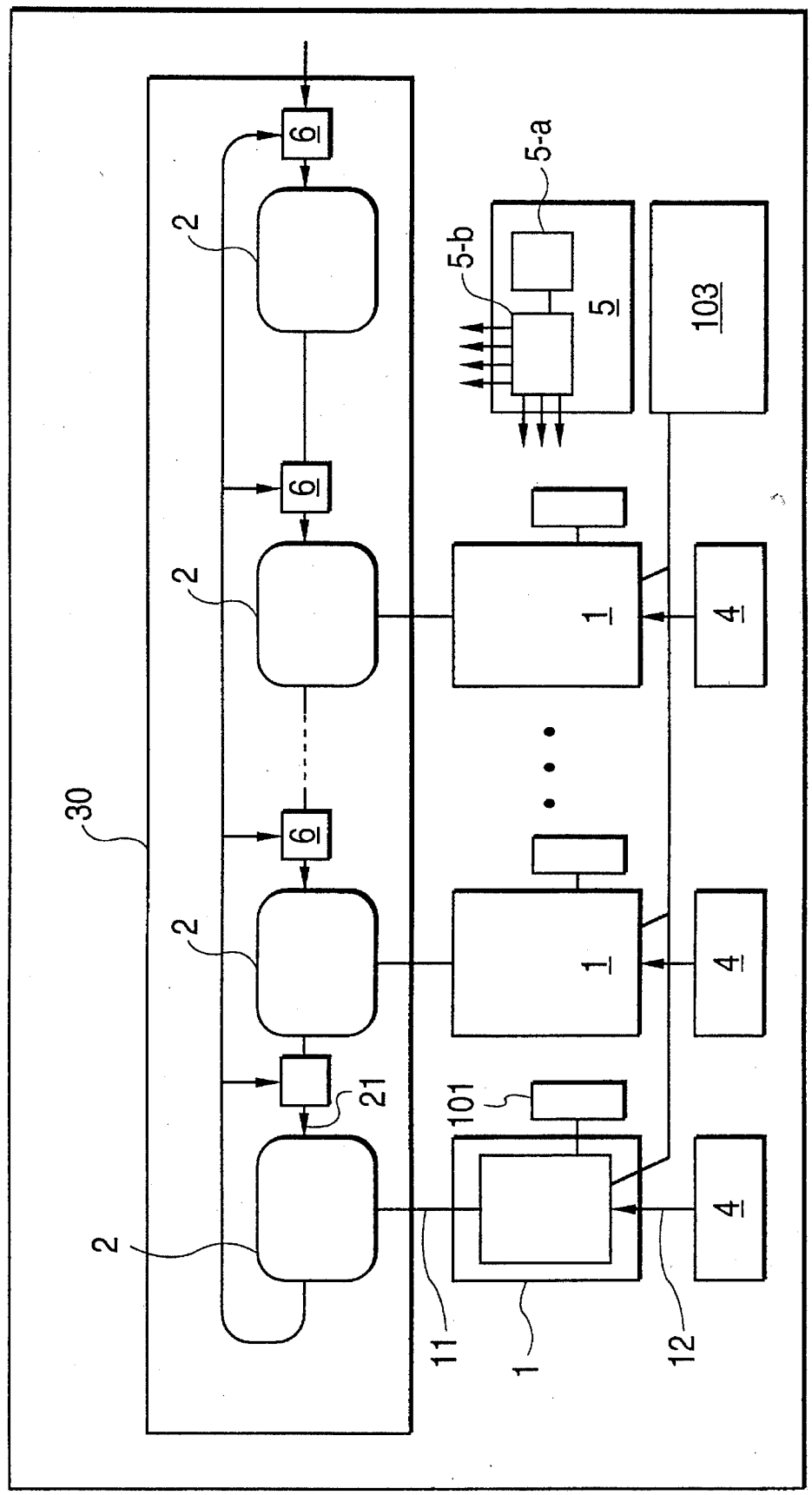
FIG. 11 is a block diagram of an embodiment of a parallel data processing system.

FIG. 11 shows a block diagram of another embodiment of the parallel data processing system according to the present invention. Like reference numbers designate like parts in FIG. 7 and FIG. 11. FIG. 11 is different from FIG. 7 in that the data are transferred between trays not only unidirectionally but also bidiretionally, in that the clock generator 5 comprises a clock generating circuit 5-a and a clock distributing circuit 5-b; and in that the sigmoid function processing unit 101 and the learning completion judging means 103, which are for a neuron computer (described later), are added.

The learning completion judging means 103 comprises a host computer connected to respective data processing units 1 through respective communication means, means for notifying an error between the result of the calculation of the data processing unit 1 and a teacher signal through the above recited communication means, and means for judging a completion of a learning based on a plurality of output errors so that the learning of the neuron computer is stopped.

FIGS. 12 to 15 show block diagrams of the third to sixth embodiments of the tray. In these embodiments, the tray is constructed such that the data transfer between them can be performed bidirectionally, namely, in both the left to right direction and the right to left direction.

Figure 12:
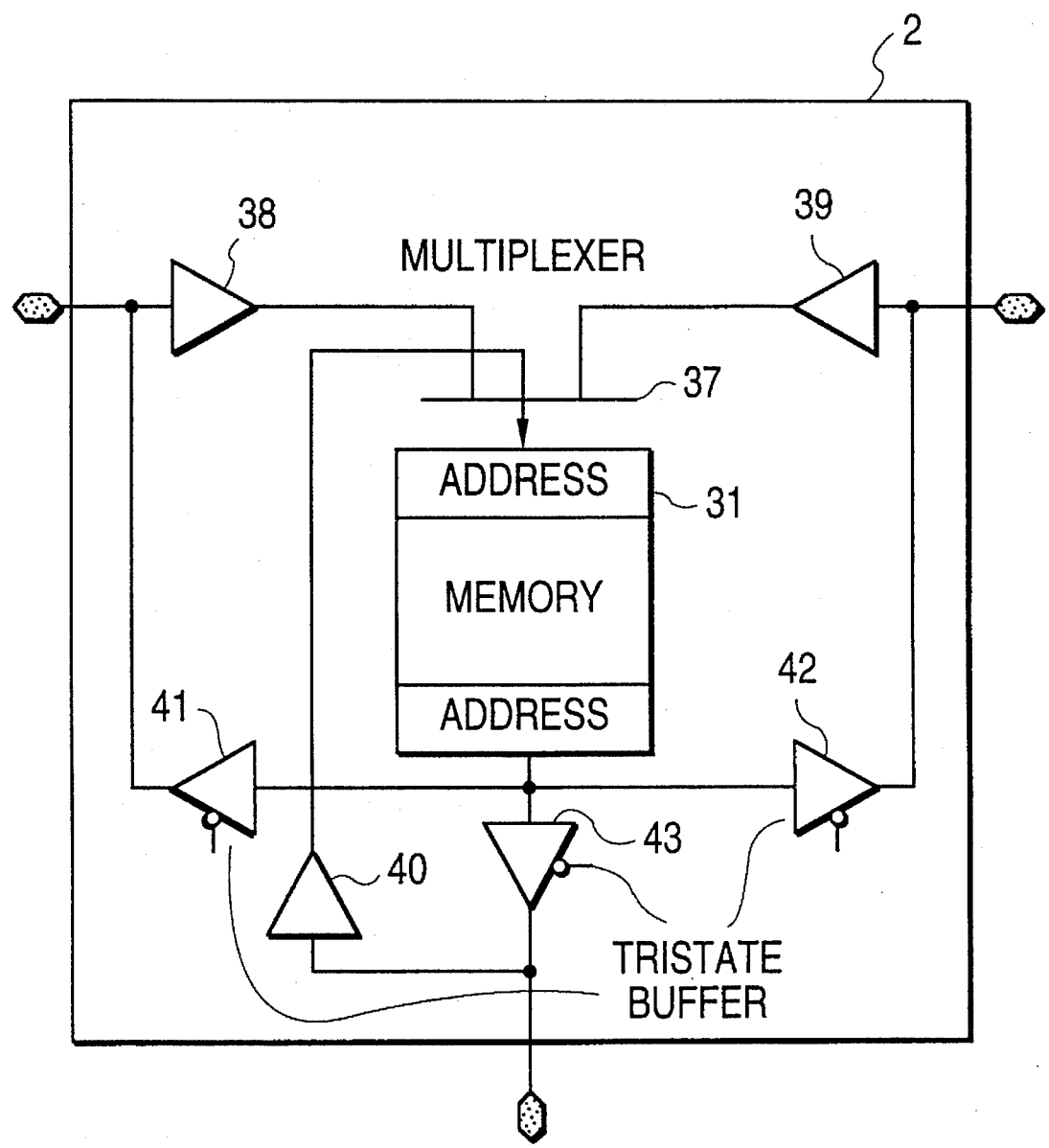
FIG. 12 is a block diagram of the third embodiment of the tray.

The third embodiment shown in FIG. 12 comprises a memory 31, which is the same as that shown in FIG. 6, for the first embodiment; a multiplexer 37 for switching an input from the right side tray or left side tray or the processor element so that the data can be inputted to the memory 31; three buffers 38 to 40 connected to three inputs from the multiplexer 37 from three terminals of the tray; and tri-state buffers 41 to 43 connected from the output terminal of the memory 31 to three terminals of the tray. In this embodiment, the input to the memory 31 is selected by the multiplexer 37 and the transfer direction of the data is controlled by buffers 38 to 40 and tri-state buffers 41 to 43.

Figure 13:
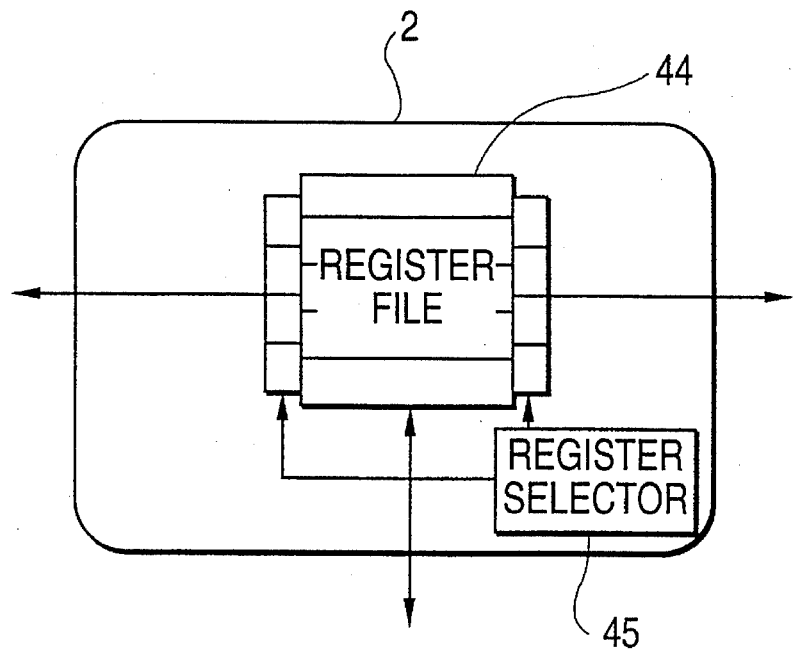
FIG. 13 is a block diagram of the fourth embodiment of the tray.

The fourth embodiment shown in FIG. 13 comprises a register file 44 and register selector 45.

Figure 14:
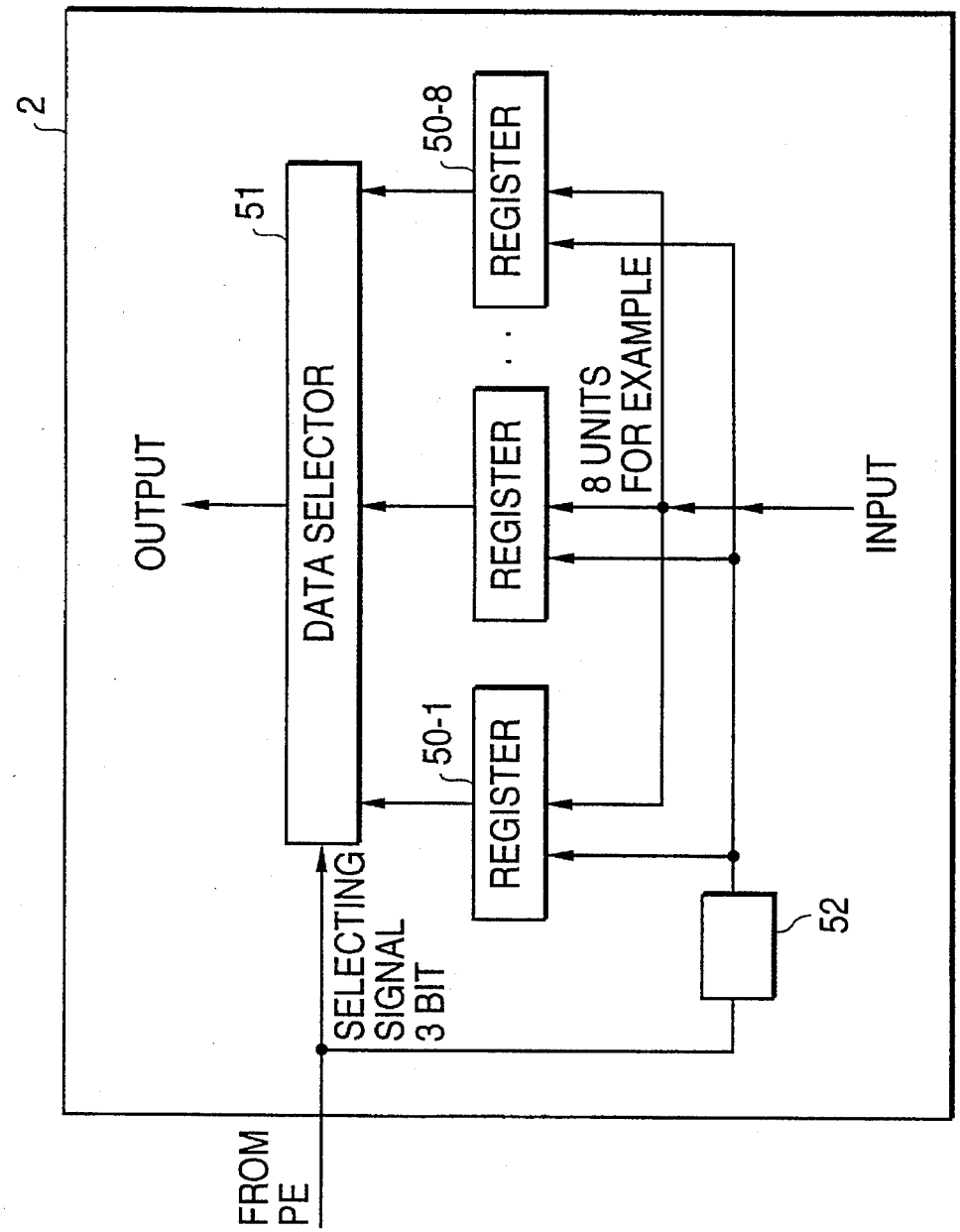
FIG. 14 is a block diagram of the fifth embodiment of the tray.

In the fifth embodiment, shown in FIG. 14, portions corresponding to the memory 31 and the multiplexer 37 in the third embodiment shown in FIG. 12 are presented. These portions comprise a plurality of registers 50-1 to 50-8, a data selector 51, and a read/write controller 52. The data inputted from the adjacent tray or processor element through three buffers (not shown), which correspond to 38 to 40 of FIG. 12, are stored in one of 8 registers 50-1 to 50-8 under the control of the controller 52 in accordance with a selection signal of three bits, for example, from the processor element. The output data from these registers are outputted through the data selector 51 in accordance with this selection signal, for example, and transmitted to the other tray or the processor through one of the tri-state buffers (which corresponds to 41 to 43 shown in FIG. 12) connected to three terminals of the tray. The tray shown in FIG. 14 can be formed in a bidirectional manner by controlling the multiplexer 37, and tri-state buffers 41, 42 and 43. The data for the first layer of the neurocomputer is written into and read from the register 50-1, for example. The data for the second layer of the neurocomputer is written into and read from register 50-2. Data selector 51 and controller 52 correspond to the register selectors 35 and 45.

Figure 15:
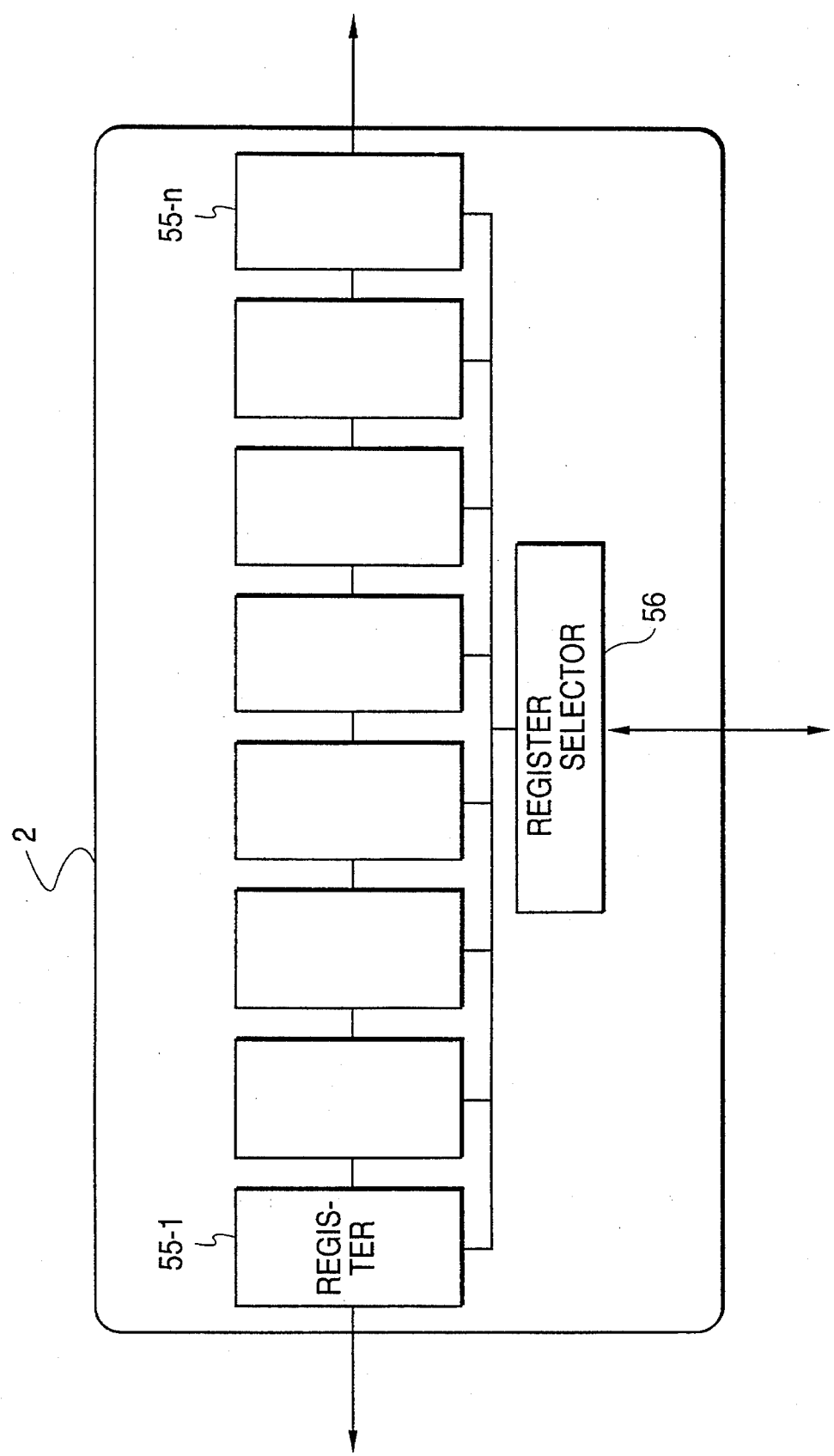
FIG. 15 is a block diagram of the sixth embodiment of the tray.

The sixth embodiment, shown in FIG. 15, comprises a plurality of registers 55-1 to 55-n, and a register selector 56 for selecting one of these registers. The plurality of registers 55-1 to 55-n correspond to the memory 31 in FIG. 12, for example, and are subjected to input and output of data between the other trays and between the processor element and the particular tray under the control of the register selector 57. Therefore, the sixth embodiment shown in FIG. 15 takes a shorter time for an input and output of data than the memory used in the tray.

The parallel data processing system can be realized as described above. According to the parallel data processing system of the present invention, a plurality of sets of data can be parallelly processed and utilized in the following processes.

That is, logical data processes using conventional von Neumann type computers cannot flexibly process various patterns of data just as human beings do. Accordingly, a neurocomputer computer is being studied and developed according to the calculation principle quite different from the conventional computers.

One of the biggest features of a neurocomputer is its learning function, and one of its widely used learning rules is an error back propagation rule. However, if the error back propagation rule is applied to a large-scale neural network or a large-volume learning data, it takes a very long time to converge learning data involved.

The above described parallel data processing system is used in learning based on the error back propagation rule.

Figure 16:
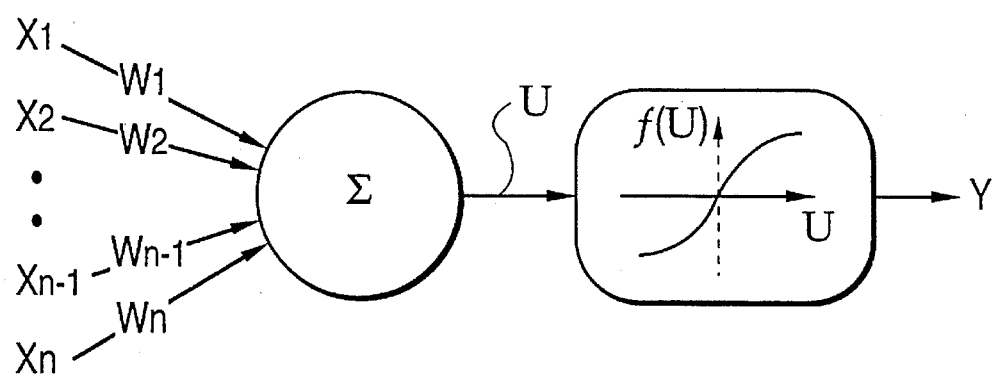
FIG. 16 shows a configuration of a neuron model.

FIG. 16 shows a configuration of a neuron model which is a basic element in a neurocomputer. The neuron model multiplies inputs $X_1, X_2, \ldots, X_n$ by weight values $W_1, W_2, \ldots, W_n$ of a synapse connection, and then calculates a sum of them to be stored as an internal state value U. The internal value U is provided with a non-linear function f, and the resultant value is an output Y. An S type sigmoid function shown in FIG. 20 is generally used as a nonlinear function f.

Figure 17:
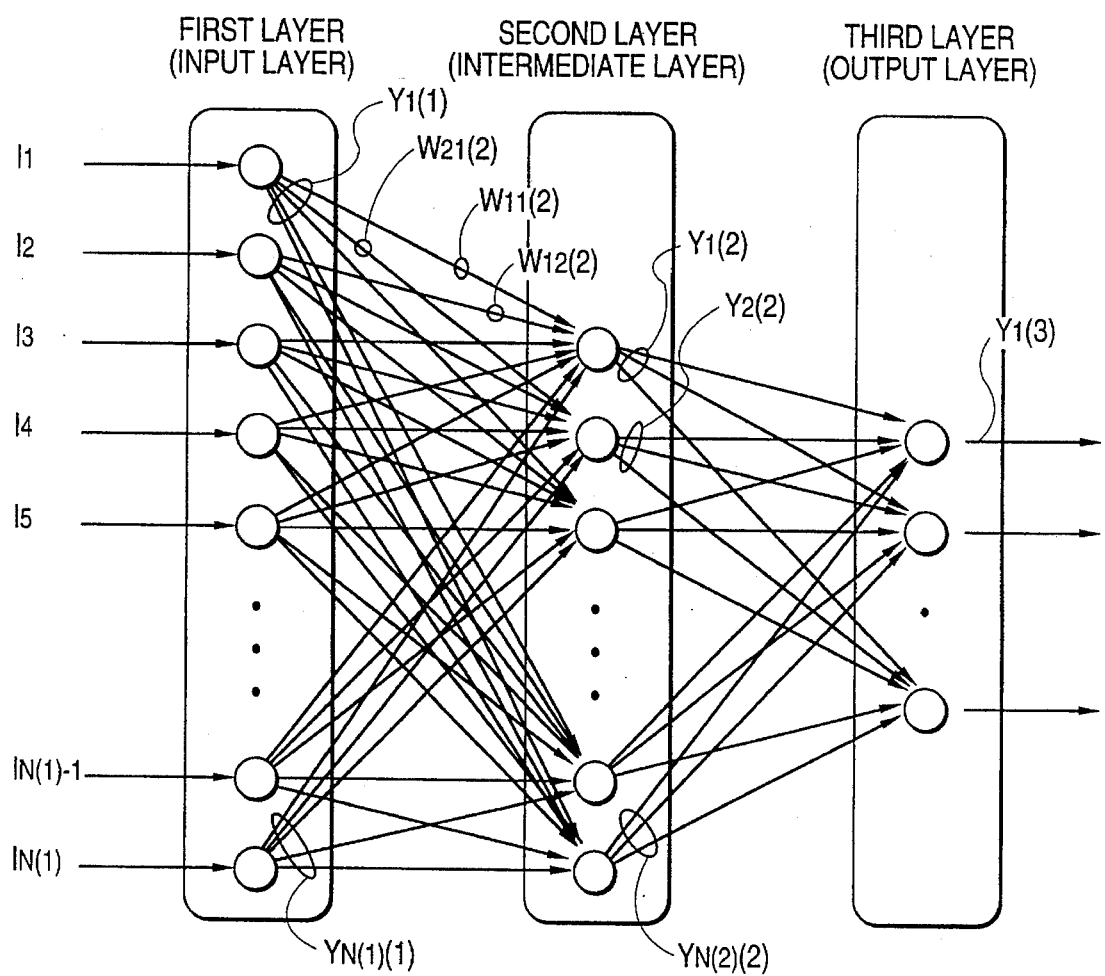
FIG. 17 shows the concept of the neural network using the neuron model shown in FIG. 16.

FIG. 17 shows a concept of a hierarchical neural network forming a neurocomputer. The neural network comprises three layers (an input layer, an intermediate layer, and an output layer) using a plurality of neurons shown in FIG. 10.

The input layer, that is, the first layer, receives input signals $I_1, I_2, \ldots, I_{N(1)}$. Each of the units, that is, neurons, in the second intermediate layer is connected to all the neurons in the first layer. The tie-branches are synapses which are given a respective weight value $W_{ij}$. The output layer, that is, the third layer, also has its units connected to all the neurons of the intermediate layer. The outputs are drawn to the outside.

In this neural network, an error between a teaching signal corresponding to an input pattern signal applied to the input layer at each learning time and an output signal from the output layer is obtained. Weight values between the intermediate layer and the output layer and between the first layer and the second layer must be determined such that the error can be the smallest possible value. This algorithm is called a back propagation law.

When weight values are determined according to the back propagation law and stored to be used in presuming a pattern recognition, etc., an output signal corresponding to the pattern is outputted from the output layer if an imperfect pattern somewhat different from a perfect pattern to be recognized is applied to a unit of the input layer of the first layer, an output signal corresponding to the applied pattern is outputted from the output layer, and the resultant signal indicates a signal similar to the teaching signal corresponding to the pattern provided at the time of learning. If the difference between the output signal and the teaching signal is very small, the imperfect pattern is recognizable.

Figure 19:
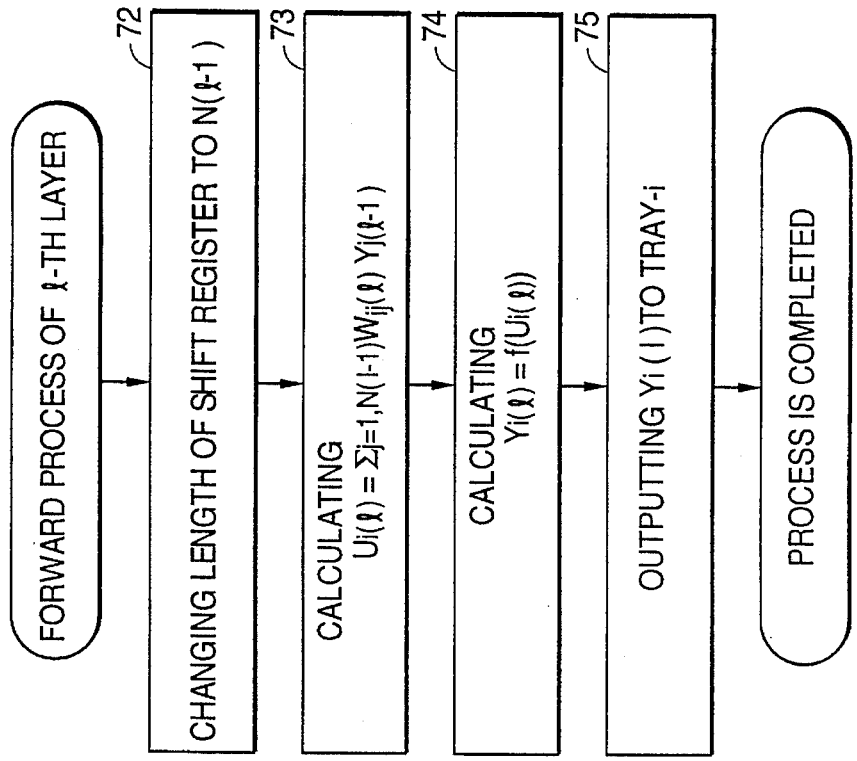
FIG. 19 is a flowchart of a learning process.

In FIG. 17, N(1) indicates the number of neurons in the first layer. Generally, the first layer, that is, the output of each neuron in the input layer is equal to its input. Therefore, no actual processes are required at all. A normal operation, that is, a forward process flowchart, for recognizing a pattern is illustrated in FIGS. 18 and 19.

Figure 18:
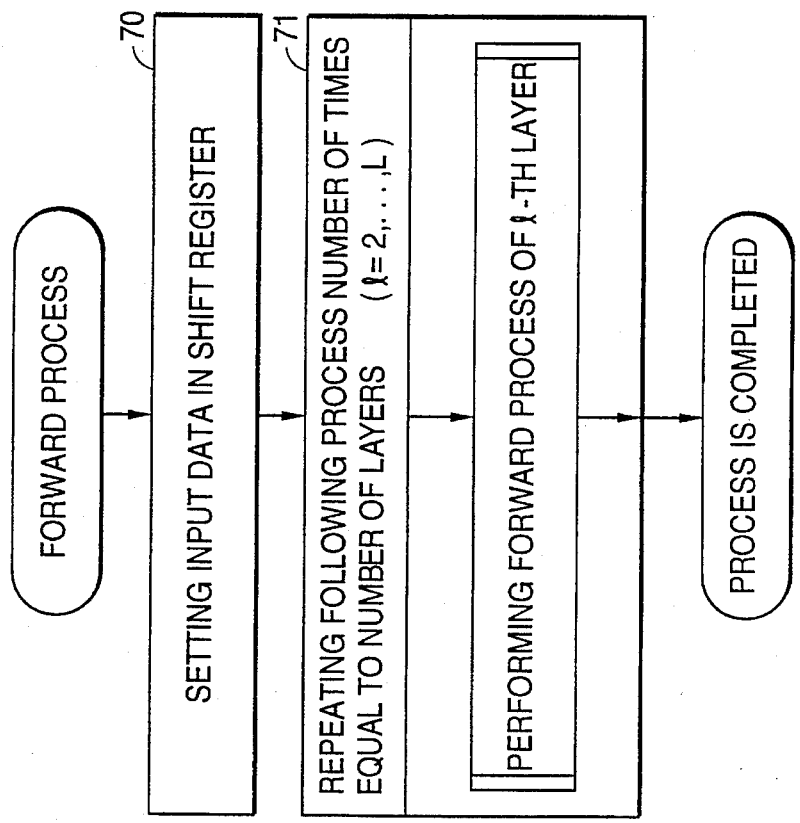
FIG. 18 is a flowchart of a forward process.

FIG. 18 is a flowchart of the whole forward process.

In the forward process in the network shown in FIG. 17, a weight coefficient of a tie-branch between layers is determined. When the network shown in FIG. 17 is realized using a neurocomputer, the following processes are performed. In the basic operation of the forward process using the neuron model shown in FIG. 16, inputs are multiplied by weight values and all the products are added to obtain the sum U. Then, a nonlinear function is applied to the sum U. This operation is performed in each layer.

First, in step 70 shown in FIG. 18, input data, that is, data from $I_1$ to $I_{N(1)}$ are set in the tray 2 in the shift register comprising the tray 2 and the data transmission path 3. After representing by L the number of layers including an input layer, the following processes are repeated for each of the L-1 layers in step 71. For example, if L is 3, the processes are repeated two times. The forward process for one layer is repeated.

Then, the process is completed. The forward process for one layer is indicated in FIG. 19.

Concerning the intermediate layer, the intermediate layer is the second layer, the input layer is the first layer, and a value equals 2. In step 72, the length of the shift register (the number of the trays) is set to N(l−1). That is, since l=2, the length of the shift register is set to N(1), that is, the number of the input layer units.

In step 73, a neuron model is processed in the intermediate layer. An index j indicates the number of the units 1 to the number N (1). $W_{ij}$ (l) indicates a weight coefficient of the connection between the input layer and the intermediate layer. That is, l= 2. $Y_j$ (l−1) indicates the output from the j-th unit in the input layer. i indicates the i-th unit in the intermediate layer. The internal state $U_i$ of the i-th unit is calculated by multiplying the output $Y_j$ of the input layer unit, that is, the j-th Y, by the weight $W_{ij}$ and obtaining the sum of the products.

In step 74, the internal state $U_i$ (2) of the i-th unit of the intermediate layer is applied to a nonlinear function, that is, a sigmoid function to provide $Y_i$ (2). That is, the sum-of-products calculation in step 73 is performed by the data processing unit 1, and the calculation using a sigmoid function can be performed by an exclusive unit.

In step 75, the output $Y_i$ (2) of the i-th unit of the intermediate layer is outputted to the i-th tray. Thus, the process terminates.

The above described forward process is performed on the intermediate and output layers. Thus, the forward process for each layer terminates. That is, the process required for a simulation of a neuron itself is the operation represented by the expression shown in FIG. 16. The operation includes the sum-of-products operation of multiplying weights by elements of input vectors and the calculation for the results using a sigmoid function. The calculation using a sigmoid function can be realized by an exclusive unit for a sigmoid function operation.

Therefore, a process for one layer in a network means performing the operation for a neuron itself for each of the neurons in the layer as shown in FIG. 17. Therefore, the vector U of the product obtained by multiplying the matrix W (l)=($W_{ij}$ (l)), where the matrix contains weight coefficients, by the vector x (l=($X_j$ (l)), where the matrix contains inputs to the layer can be calculated as follows.

$$U(l) = [U_i(l)]$$
$$= \sum_{j=1}^{N(1)} W_{ij}(l) X_j(l)$$

The sigmoid function operation can be performed by inputting each element of a product vector, that is, $U_i$ (l), to each of the exclusive sigmoid function process units and outputting the corresponding function $Y_i$ (l)=f ($U_i$(l)). If there is a following layer, that is, the (l+1)th layer, each function output $Y_i$ (l) is written into each tray. In the process of the (l+1)th layer, the output $Y_i$ (l is used as an input and the above procedure is repeated.

The learning operation using a neuron computer, that is a back propagation algorithm, is described below.

FIG. 20 is a learning process flowchart. A learning using a neuron computer means modifying the weight value of each neuron until the network establishes a desired input/output relationship.

This learning operation is provided with a plurality pairs of a desired input signal vector and a teaching signal vector. Then, one pair among them is selected, and the input signal $I_p$ of the selected pair is applied to the learning network. Next, the output of the network in response to the input is compared with the right output signal, that is, the teaching signal $O_p$ corresponding to the input signal. The difference between these two signals is referred to as an error. The weight value of each neuron can be modified according to the error and the values of the input/output signals.

This process is repeated for each of the elements until the learning converges. That is, all the input patterns are learned. In this weight-modifying process referred to as a backward process, an error obtained at the output layer is modified and propagated toward the input layer, that is, in the direction opposite to the normal signal direction. This is the algorithm of the pack propagation method.

The error D is recursively defined as follows. $D_i$ (l) is an error which is propagated backward from the i-th neuron in the l-th layer. L is the number of layers in the network.

$$D_i(L) = f'(U_i(L))(Y_i(L) - O_{Pi}) \quad (1)$$
(last layer)
$$D_i(l-1) = f'(U_i(l-1)) \quad (2)$$

$$\sum_{j=1}^{N(l)} W_{ij}(l) D_i(l)$$

$(l = 2, \ldots, L)$
$(i = 1, \ldots, N(l))$ where f'(U) is the value of the differential coefficient f'(X) of the sigmoid function f(X) when X= U. If, for example, $$f(X) = \tanh X \quad (3)$$
then
$$f'(X) = d(\tanh X)/dX = 1 - \tanh^2 X \quad (4)$$
$$= 1 - f^2(X)$$

This gives the following expression:

$$f'(Ui) = 1 - f^2(Ui) = 1 - Yi^2 \quad (5)$$

According to the $D_i$ and $Y_j$, a weight value is updated as follows. Basically, the following expression is used. Here, η indicates the unit in which a weight value is updated. If it is too small, it takes a longer time to converge a learning. If it is too large, no convergence is attained. t means the number of times of updating a weight value.

$$W_{ij}(l)^{(t+1)} = W_{ij}(l)^{(t)} + \Delta W_{ij}(l)^{(t)} \quad (6)$$

$$\Delta W_{ij}(l)^{(t)} = \eta D_i(l) Y_j(l-1) \quad (l=2, \ldots, L) \quad (7)$$

However, the following expression is frequently used. This is obtained by passing $\Delta W_{ij}(l)^{(t)}$ in the expression (7) through the first digital low pass filter, and α is a parameter for determining the time constant of the filter.

$$\Delta W_{ij}(l)^{(t+1)} = \eta D_i(l) Y_j(l-1) + \alpha \Delta W_{ij}(l)^{(t)} \quad (8)$$

This operation required in the backward process is performed as an inter-vector operation or a matrix-and-vector operation. The most important calculation therein is a multiplication of the transposed matrix ($W^T$) of the weight matrix W having weight values of neurons in each layer by the above error vector $D_j$ (l). In the general case where there are a plurality of neurons in a layer, the error is represented by a vector.

The flowchart shown in FIG. 20 is described below. The forward process and the backward process for the network of the L layer are performed. First, the input data $I_p$ are set in the shift register, and the forward process for one layer is performed in step 77.

Since the process is performed for each layer, the forward process is repeated the number of times equal to the number of layers except input layers. Then, the output data $O_p$ are outputted to be set in the shift register in step 78. The process of step 79 is parallelly performed for the number of the times equal to the number of output layer units. That is, the error $D_i(L) = Y_i(L) - O_p(i)$ is calculated and set in the i-th tray. Then, the backward process is performed in step 80 for each layer from the output layer to the input layer.

FIG. 21 indicates the backward process. Concerning the l-th layer, since the number of the layer units is N(l), the length of the shift register is set to N(l) in step 81. Then, the following process is parallelly performed in step 82 for each of the units in the previous layer. That is, the operation of the above expression (2) is performed in step 83. It must be noted that the weight value is $W_{ji}(l)$, which indicates an element of the transposed matrix (W) of the weight matrix.

In step 84, the above expressions (6), (7), and (8) are calculated to update the weight values. In step 85, the obtained error $D_i(l-1)$ is outputted to the i-th tray. This is necessary for the operation in step 84 in order to calculate the next error.

FIG. 22 is a flowchart for explaining the repetition of the forward and the backward processes until the learning converges. In these processes, several processes are performed, for example, for smooth modification of weight values to stabilize the learning and the update of weight values. These processes include multiplication of a matrix by a scalar and addition/subtraction between matrices, and they can be performed by the present neurocomputer.

An exclusive sigmoid function unit can be realized in software as well as in hardware.

Figure 23:
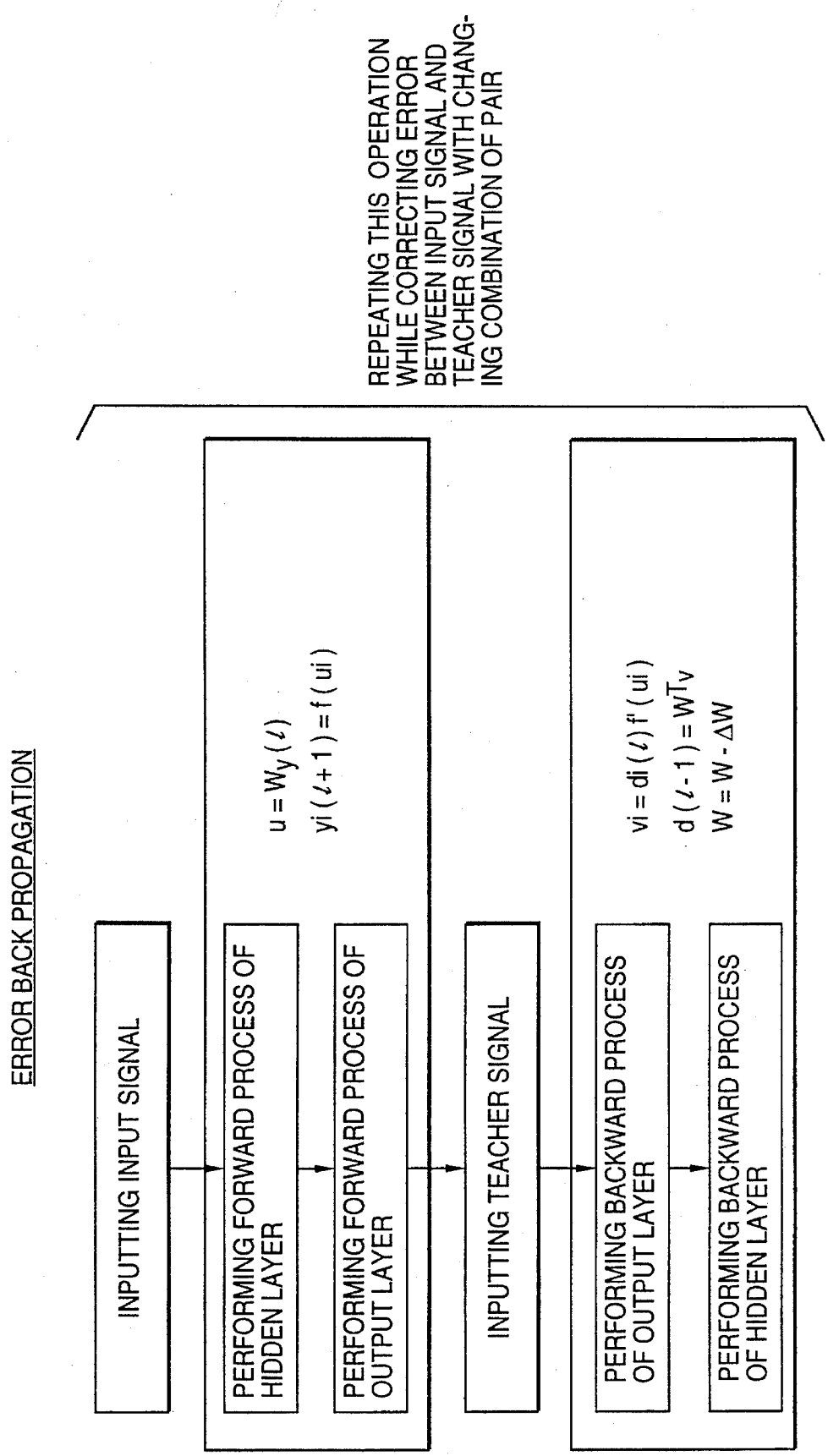
FIG. 23 is a flowchart of the whole learning process.

The neurocomputer is further described by referring to FIG. 23. FIG. 23 is a process flow for the learning based on the error back propagation method. In FIG. 16, y(l) is a output vector of a neuron of the l-th layer. W is a connection coefficient, that is, a weight matrix. f is a sigmoid function, d(l) is an error vector propagated backward from the output side of the l-th layer, and ΔW is a modification of a weight value.

When an input signal is applied to a three-layer configuration in which no operations are performed on input layers, the forward process is performed on a hidden layer, that is, an intermediate layer. This is represented by $u=W_y(l)$. If the internal state vector u is provided with a nonlinear function, an input is provided for the next layer, that is, the (l+1)th layer. Since this is the input to the output layer, the forward process is performed on the output layer.

Then, a teaching signal is inputted to start the backward process.

In the output layer, the error d between the teaching signal and the output signal is multiplied by the differentiation of f to perform the backward process. An error associated with the intermediate layer can be calculated by multiplying the variable v by the transposed matrix (W), that is, $W^T$ of the weight matrix.

The backward process of the output layer and the backward process of the hidden layer are thus performed. The forward process includes the multiplication of the weight matrix W by the input vector y and the calculation of a sigmoid function of each element of the resultant vector. These operations can be parallelly performed by each of the neurons. The backward process is classified into two jobs: the first job is a backward propagation from the back to the front while sequentially modifying the error between the teaching signal and the output signal, and the second job is the multiplication of the weight matrix W by the transposed matrix (W).

Figure 24:
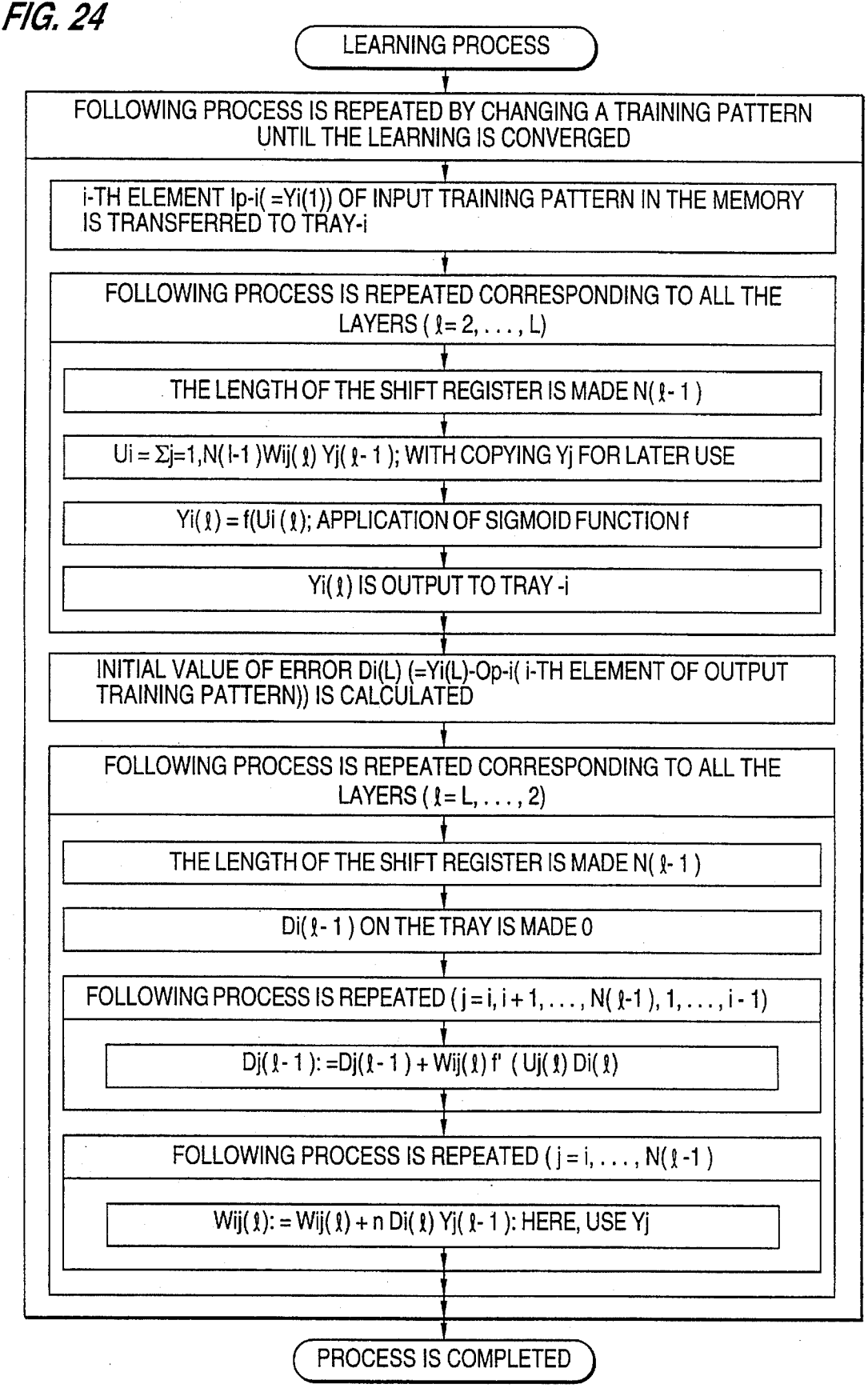
FIG. 24 is a flowchart of an error back propagation learning rule according to the present invention.

FIG. 24 is a flowchart of an embodiment of a learning rule of the error back propagation. It corresponds to the above recited FIGS. 18 to 21, but is different from them in that at step 73a the output of the unit of respective layers is provided to a register in the tray, unlike step 73, and in step 88 between step 83 and 84 the unit output value stored in the register in the tray is obtained. This difference can be realized by providing a plurality of registers for the register file in the tray, thereby achieving a higher processing speed than with the memory. The present invention can be effectively used for an operation of a product between a matrix and a vector in a parallel computer system and an operation of a neuron computer.

According to a modification of the present invention, a plurality of registers for respectively storing data for the respective layers may be provided in each of the processor elements although the operation speed in which the weight is updated is lower than that of the embodiments shown above.

What is claimed is:

1. A parallel data processing system including a plurality of data processing units comprising:

a plurality of trays, only a part of said plurality of trays having outputs operatively connected to said plurality of data processing units and each of said plurality of trays being connected to an adjacent said tray, said part of said plurality of trays being connected to said plurality of data processing units for transmitting and receiving data to and from said plurality of data processing units and said adjacent trays and for storing said data transmitted from said plurality of data processing units and said adjacent trays, and a remaining part of said plurality of trays being not connected to said plurality of data processing units for transmitting and receiving data to and from said adjacent trays and for storing said data transmitted from said adjacent trays; and a clock generator, connected to said plurality of trays and said plurality of data processing units, which generates a clock signal for use in synchronously performing the transfer of said stored data between said plurality of trays and said plurality of data processing units and the data transfer between said part of said plurality of trays and said plurality of data processing units and a data process in said plurality of data processing units.

2. The parallel data processing system according to claim 1, further comprising a data transfer path in which each of said plurality of trays has a shift register connected to each other to form a cyclical shift register.

3. The parallel data processing system according to claim 2, wherein said cyclical shift register comprises a connection means, connected between each two of said trays, for performing a short-cut operation of said cyclical shift register and for modifying a number of trays included in said cyclical shift register to change a length of the cyclical shift register.

4. The parallel data processing system according to claim 3, wherein each of said trays comprises:

data input and output terminals which transfer data through said cyclical shift register and exchange data with said data processing units;

a memory having a plurality of areas which store a plurality of data and are designated by an address and having output terminals which transfer the data through said cyclical shift register;

a multiplexer which selects data from an input terminal of an adjacent tray or from a corresponding connected data processing unit, transmits said selected data through said cyclical shift register and enables said selected data to be inputted to said memory; and a tri-state buffer which outputs data from said memory to said data processing unit.

5. The parallel data processing system according to claim 2, wherein said tray comprises a register file for storing data to be transmitted through said cyclical shift register and data to be inputted to and outputted from said data processing unit; and control means for controlling the data inputted to and outputted from said register file.

6. The parallel data processing system according to claim 2, wherein the data transfer in said cyclical shift register is bidirectional.

7. The parallel data processing system according to claim 6, further comprising connecting means inserted between two of said plurality of trays connected by said cyclical shift register, for performing a short-cut of said cyclical shift register for changing a number of the trays included in said cyclical shift register so that a length of said cyclical shift register is changed.

8. The parallel data processing system according to claim 6, wherein one tray of said plurality of trays comprises:

a memory having a plurality of areas designated by an address and holding a plurality of data;

a multiplexer having three input terminals and one output terminal, said output terminal being connected to a data input terminal of said memory;

a plurality of buffers, two of said buffers each having an input terminal connected to an adjacent tray among said plurality of trays through said data transfer path and each having an output terminal connected to one of said input terminals of said multiplexer, and a third of said buffers having an input terminal connected to said data processing unit and having an output terminal connected to said one input terminal of said multiplexer; and a plurality of tri-state buffers, two of said tri-state buffers each having an input terminal connected to a data output terminal of said memory and each having an output terminal connected to an adjacent tray, a third of said tri-state buffers having an input terminal connected to said data output terminal and having an output terminal connected to said data processing unit.

9. The parallel data processing system according to claim 6, wherein said one tray comprises a register file comprising a plurality of registers which store the data to be transmitted to said adjacent tray and store the data to be inputted to and outputted from said data processing unit, and a control unit which controls the data inputted to and outputted from said register file.

10. The parallel data processing system according to claim 6, wherein said one tray comprises:

a plurality of registers which hold a plurality of data;

a demultiplexer which stores data inputted from the data transmission path in the cyclical shift register for the data processing unit in one of said plurality of registers in accordance with a selection signal provided by said data processing unit; and a data selector which outputs the data stored in one of said plurality of registers to the data transmission path on the cyclical shift register for the data processing unit in accordance with said selection signal.

11. The parallel data processing system according to claim 6, wherein said one tray comprises:

a plurality of registers which hold a plurality of data;

a register selector which selects a plurality of registers, and a control unit which controls an input and output with regard to the data transferred from said cyclical shift register and the data inputted to and outputted from the data processing unit.

12. The parallel data processing system according to claim 1, wherein said data processing unit is provided with a sigmoid function processing unit.

13. The parallel data processing system according to claim 1, wherein said data processing unit is provided with a memory for providing at least one variable to said data processing unit.

14. The parallel data processing system according to claim 1, wherein said data processing unit performs an operation of a product of a matrix and a vector.

15. The parallel data processing system according to claim 1, wherein said data processing unit performs an operation of an output from an output layer unit with regard to input data provided to an input layer unit of a neural network as forward propagation processing of said neural network.

16. The parallel data processing system according to claim 15, wherein said tray maintains output of the output layer unit and the input layer unit corresponding to respective layers of said neural network in the forward propagation processing of said neural network; and said data processing unit performs a learning operation as a backward processing of the neural network by using an output value stored in said tray.

\* \* \* \* \*